United States Patent
Jin et al.

(10) Patent No.: US 12,342,299 B2
(45) Date of Patent: *Jun. 24, 2025

(54) METHOD AND APPARATUS FOR INDICATING SEMI-PERSISTENT SOUNDING REFERENCE SIGNAL AS REFERENCE SIGNAL OF NEIGHBORING CELL IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Alexander Sayenko, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,975

(22) Filed: Apr. 28, 2023

(65) Prior Publication Data

US 2023/0269680 A1    Aug. 24, 2023

Related U.S. Application Data

(63) Continuation of application No. 17/385,371, filed on Jul. 26, 2021, now Pat. No. 11,641,631, which is a
(Continued)

(30) Foreign Application Priority Data

May 10, 2018   (KR) .......... 10-2018-0053464

(51) Int. Cl.
H04W 72/04    (2023.01)
H04L 5/00     (2006.01)
(Continued)

(52) U.S. Cl.
CPC ......... *H04W 56/001* (2013.01); *H04L 5/0048* (2013.01); *H04L 27/2602* (2013.01)

(58) Field of Classification Search
CPC ..... H04W 72/21; H04W 72/20; H04W 76/14; H04W 72/23; H04W 72/0446; H04W 64/00; H04W 72/04; H04W 88/02
See application file for complete search history.

(56) References Cited

U.S. PATENT DOCUMENTS 9,888,478 B2    2/2018 Kim et al.
10,187,878 B2 *  1/2019 Lin ................. H04W 72/23
(Continued)

FOREIGN PATENT DOCUMENTS

CN    103873213 A    6/2014
CN    104919845 A    9/2015
(Continued)

OTHER PUBLICATIONS

Korean Office Action dated May 15, 2023, issued in Korean Application No. 10-2018-0053464.
(Continued)

*Primary Examiner* — Sai Aung
(74) *Attorney, Agent, or Firm* — Jefferson IP Law, LLP

(57) ABSTRACT

A communication method and a system for converging a 5$^{th}$ generation (5G) communication system for supporting higher data rates beyond a 4$^{th}$ generation (4G) system with a technology for internet of things (IoT) are provided. The disclosure may be applied to intelligent services based on the 5G communication technology and the IoT-related technology, such as smart home, smart building, smart city, smart car, connected car, health care, digital education, smart retail, security and safety services. Disclosed is a method of performing activation and deactivation of a semi-persistent sounding reference signal (SP SRS) through
(Continued)

a medium access control element (MAC CE) when activation/deactivation of the SP SRS is indicated in a next-generation mobile communication system.

20 Claims, 25 Drawing Sheets

Related U.S. Application Data continuation of application No. 16/409,161, filed on May 10, 2019, now Pat. No. 11,075,730.

(51) Int. Cl.
*H04W 56/00* (2009.01)
*H04W 72/12* (2023.01)
*H04W 72/23* (2023.01)
*H04L 27/26* (2006.01)

(56) References Cited

U.S. PATENT DOCUMENTS

| | | | |
|---|---|---|---|
| 10,764,007 B2* | 9/2020 | Zhao | H04L 5/0048 |
| 2013/0163533 A1* | 6/2013 | Anderson | H04L 1/1812 |
| | | | 370/329 |
| 2015/0296522 A1* | 10/2015 | Bergström | H04B 7/0626 |
| | | | 370/329 |
| 2017/0078006 A1* | 3/2017 | Liu | H04L 27/2613 |
| 2017/0104567 A1* | 4/2017 | Luo | H04W 72/0446 |
| 2018/0123654 A1* | 5/2018 | Park | H04B 7/0456 |
| 2018/0199225 A1 | 7/2018 | Kim et al. | |
| 2018/0206132 A1* | 7/2018 | Guo | H04W 72/0473 |
| 2019/0190669 A1* | 6/2019 | Park | H04B 7/043 |
| 2020/0235802 A1* | 7/2020 | Nilsson | H04L 25/0226 |
| 2020/0366417 A1* | 11/2020 | Lei | H04L 1/1685 |
| 2020/0374048 A1* | 11/2020 | Lei | H04L 1/1896 |

FOREIGN PATENT DOCUMENTS

| | | |
|---|---|---|
| CN | 107852634 A | 3/2018 |
| KR | 10-2018-0016301 A | 2/2018 |
| RU | 2 648 258 C1 | 3/2018 |
| WO | 2017/052343 A1 | 3/2017 |
| WO | 2018/064313 A1 | 4/2018 |

OTHER PUBLICATIONS

European Office Action dated May 31, 2023, issued in European Application No. 19 800 060.6.
CATT, Remaining details on beam management, 3GPP TSG RAN WG1 Meeting 91, R1-1720182, Reno, USA, Nov. 18, 2017, See section 3.
Nokia et al., Introduction of MAC CEs for NR MIMO, 3GPP TSG-RAN WG2 #101, R2-1803796, Athens, Greece, Mar. 14, 2018, See sections 5.x.7, 6.1.3.R.
Nokia et al., MAC CEs definition for NR MIMO, 3GPP TSG-RAN WG2 #101, R2-1802612, Athens, Greece, Feb. 16, 2018, See sections 2, 6.1.3.R.
Vivo, Remaining details on beam measurement and reporting, 3GPP TSG RAN WG1 Meeting #91, R1-1719769, Reno, USA, Nov. 18, 2017, See section 2.3.
International Search Report dated Aug. 19, 2019, issued in the International Application No. PCT/KR2019/005567.
Huawei et al., "Introducing MAC CEs for NR MIMO", 3GPP Draft, R2-1801948 Introducing MAC CES for NR MIMO, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 15, 2018 (Feb. 15, 2018), XP051399384.
Huawei et al., "Text proposal on MAC CEs for NR MIMO", 3GPP Draft, R2-1801949, Text Proposal on MAC CES for NR MIMO, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 15, 2018 (Feb. 15, 2018), XP051399385.
Nokia et al., "Summary of offline on MAC CEs definition for NR MIMO", a 3GPP Draft, R2-1803971, MAC CES Definition for NR MIMO—CB 121 Summary, 3rd Generation Partnership Project (3GPP), Mobile Competence Centre, 650, Route Des Lucioles, F-06921 Sophia-Antipolis Cedex, vol. RAN WG2, No. Athens, Greece, Feb. 26, 2018-Mar. 2, 2018, Mar. 2, 2018 (Mar. 2, 2018), XP051401008.
Extended European Search Report dated Apr. 16, 2021, issued in European Patent Application No. 19800060.6.
Russian Office Action dated Oct. 25, 2021, issued in Russian Patent Application No. 2020136627/07(067493).
ZTE et al; "MAC CE for activation/deactivation of semi-persistent SRS", 3GPP Draft; R2-1801932 MAC CE for Activation or Deactivation of Semi-Persistent SRS, 3rd Generation Partnership Project (3GPP), Mobile Competence Centre ; 650, Route Des Lucioles ; F-06921 Sophia-Anti vol. RAN WG2, No. Athens, Greece; Feb. 26, 2018-Mar. 2, 2018 Feb. 14, 2018 (Feb. 14, 2018), XP051399044.
LG Electronics; "Discussion on non-codebook based transmission for UL", 3GPP Draft; R1-1717937 UL_Non-CB_Final, 3rd Generation Partnership Project (3GPP), Mobile Competence Centre ; 650, Route Des Lucioles ; F-06921 Sophia-Antipolis Cedex ; France vol. RAN WG1, No. Prague, CZ; Oct. 9, 2017-Oct. 13, 2017 Oct. 3, 2017 (Oct. 3, 2017), XP051352818.
European Search Report dated Nov. 21, 2022, issued in European Application No. 19 800 060.6.
Vivo; Some corrections on beam management MAC CE; 3GPP TSG-RAN WG2 Meeting#101bis; R2-1804675; Apr. 16-20, 2018; Apr. 5, 2018; Sanya, China.
Chinese Office Action with English translation dated Sep. 12, 2023; Chinese Appln. No. 201980039494.5.
Summons to Oral Proceedings dated Nov. 22, 2023; European Appln. No. 19 800 060.6-1215.
Chinese Notice of Allowance with English translation dated Apr. 3, 2024; Chinese Appln. No. 201980039494.5.
European Notice of Allowance dated Aug. 2, 2024; European Appln No. 19 800 060.6-1215.

* cited by examiner

[1g-a] Solution 2

(Case 2g-A)

(Case 2g-B)

(Case 2h-A)

(Case 2h-B)

(Case 2h-C)

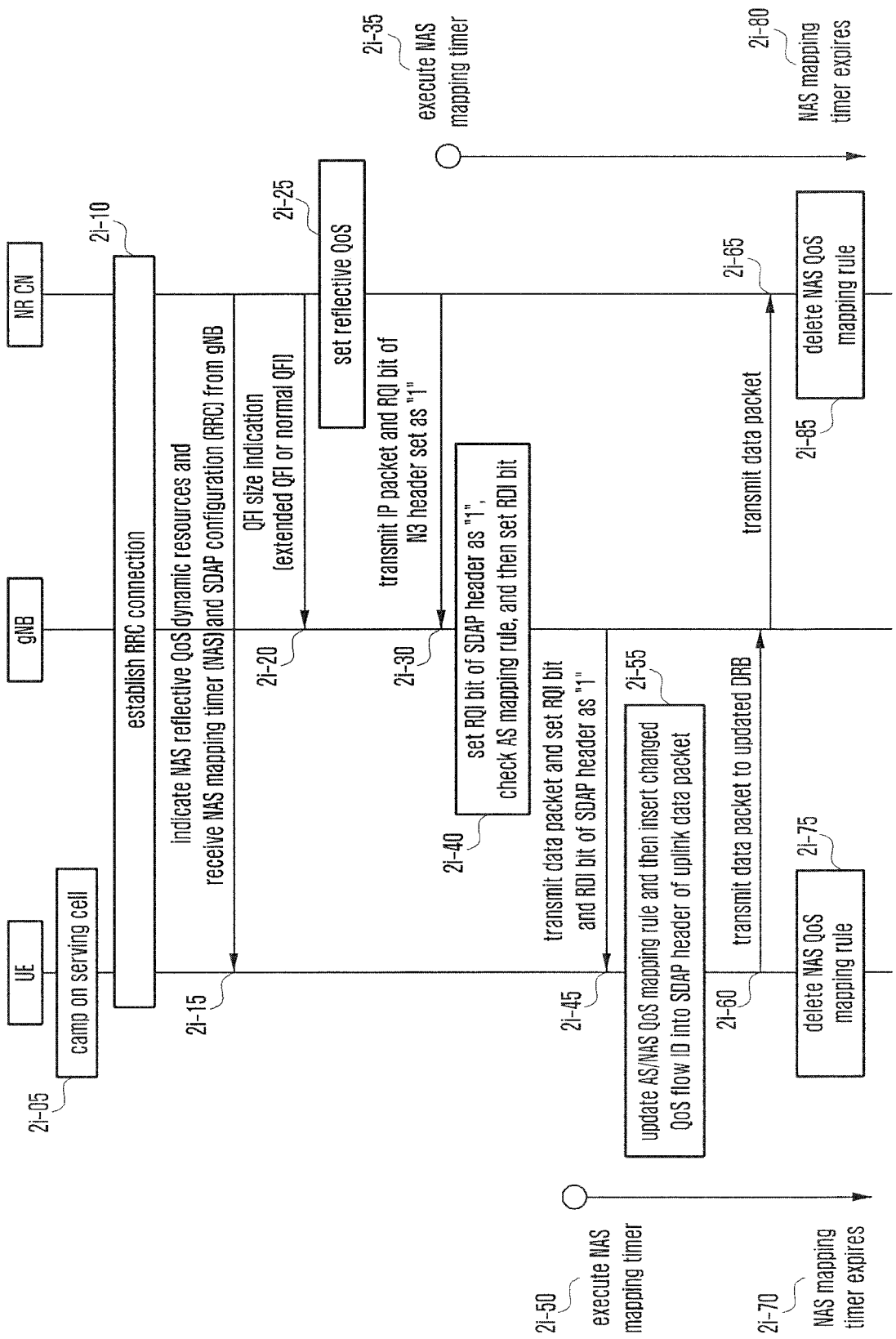

(Case 2j-A. Dynamic switching QFI length

[Case 2j-B.Static QFI length]

METHOD AND APPARATUS FOR INDICATING SEMI-PERSISTENT SOUNDING REFERENCE SIGNAL AS REFERENCE SIGNAL OF NEIGHBORING CELL IN NEXT-GENERATION MOBILE COMMUNICATION SYSTEM

CROSS-REFERENCE TO RELATED APPLICATION(S)

This application is a continuation application of prior application Ser. No. 17/385,371, filed on Jul. 26, 2021, which will be issued as U.S. Pat. No. 11,641,631 on May 2, 2023, which is a continuation application of prior application Ser. No. 16/409,161, filed on May 10, 2019, which has been issued as U.S. Pat. No. 11,075,730 on Jul. 27, 2021, which was based on and claimed priority under 35 U.S.C § 119(a) of a Korean patent application number 10-2018-0053464, filed on May 10, 2018, in the Korean Intellectual Property Office, the disclosure of which is incorporated by reference herein in its entirety.

BACKGROUND

1. Field

The disclosure relates to an operation of a user equipment (UE) and an evolved node B (eNB) in a mobile communication system. More particularly, the present disclosure relates to a method of activating/deactivating a semi-persistent sounding reference signal in a next-generation mobile communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

When activation/deactivation of a semi-persistent sounding reference signal (SP SRS) in a next-generation mobile communication system is indicated, a beam through which the corresponding SP SRS is transmitted, that is, a quasi-co-located (QCLed) beam, may be indicated. A method by which a user equipment (UE) and an evolved node B (eNB) transmit and receive SP SRS signals through appropriate directional beams is needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of activating/deactivating a semi-persistent sounding reference signal in a next-generation mobile communication system.

Another aspect of the disclosure is to provide a method of generating a medium access control (MAC) control element (CE) for, when a beam through which the corresponding sounding reference signal to be transmitted is indicated, indicating not only the current serving cell and a bandwidth part (BWP) but also a neighboring serving cell and a BWP.

Another aspect of the disclosure is to provide a procedure and a method for providing a flow-based quality of service (QoS) introduced in a next-generation mobile communication system and extending a QoS flow identification (ID) since a 6-bit QoS flow ID within a current 1-byte service data access protocol (SDAP) header is insufficient to express all services for a new QoS layer (SDAP) indicating a change in a flow-mapping rule of an access stratum (AS) and a non-access stratum (NAS) to wireless protocols of a user equipment (UE) and an evolved Node B (eNB) through a user data packet.

An embodiment of the disclosure is to provide an efficient communication method.

Additional aspects will be set forth in part in the description which follows and, in part, will be apparent from the description, or may be learned by practice of the presented embodiments.

According to an embodiment of the disclosure, it is possible to indicate not only a current serving cell and a BWP but also a neighboring serving cell and a BWP when a semi-persistent sounding reference signal is activated/deactivated through a MAC CE in a next-generation mobile communication system.

According to another embodiment of the disclosure, it is possible to distinguish and support various services by supporting flow-based QoS through a wireless interface and then supporting extension of the QoS flow in a next-generation mobile communication system.

In accordance with an aspect of the disclosure, a method of indicating a semi-persistent (SP) sounding reference signal (SRS) as a reference signal by a terminal is provided. The method includes receiving, from a base station, information for an SRS configuration, receiving, from the base station, a MAC CE for activating the SP SRS, and transmitting, to the base station, an SRS on a first cell based on the information for the SRS configuration and the MAC CE for activating the SP SRS, wherein the MAC CE for activating the semi-persistent SP SRS includes an indicator for indicating whether serving cell information and BWP information for a reference signal associated with spatial relationship are present.

In accordance with another aspect of the disclosure, a terminal is provided. The terminal includes a transceiver, and at least one processor coupled with the transceiver and configured to receive information for a SRS configuration, to receive a MAC CE for activating a SP SRS, and to transmit an SRS on a first cell based on the information for the SRS configuration and the MAC CE for activating the SP SRS, wherein the MAC CE for activating the SP SRS includes an indicator for indicating whether serving cell information and BWP information for a reference signal associated with spatial relationship are present.

In accordance with another aspect of the disclosure, a method of indicating an SP SRS as a reference signal by a terminal is provided. The method includes transmitting, to a terminal, information for a SRS configuration, transmitting, to the terminal, a MAC CE for activating a SP SRS, and receiving, from the terminal, an SRS on a first cell based on the information for the SRS configuration and the MAC CE for activating the SP SRS, wherein the MAC CE for activating the SP SRS includes an indicator for indicating whether serving cell information and BWP information for a reference signal associated with spatial relationship are present.

In accordance with another aspect of the disclosure, a base station is provided. The base station includes a transceiver, and at least one processor coupled with the transceiver and configured to transmit, to a terminal, information for a SRS configuration, to transmit, to the terminal, a MAC CE for activating a SP SRS, and to receive, from the terminal, an SRS on a first cell based on the information for the SRS configuration and the MAC CE for activating the SP SRS, wherein the MAC CE for activating the SP SRS includes an indicator for indicating whether serving cell information and BWP information for a reference signal associated with spatial relationship are present.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2I illustrates an overall QoS processing operation to which a QoS mapping rule between a CN and a UE is applied according to an embodiment of the disclosure;

Throughout the drawings, it should be noted that like reference numbers are used to depict the same or similar elements, features, and structures.

DETAILED DESCRIPTION

Figure 1A:
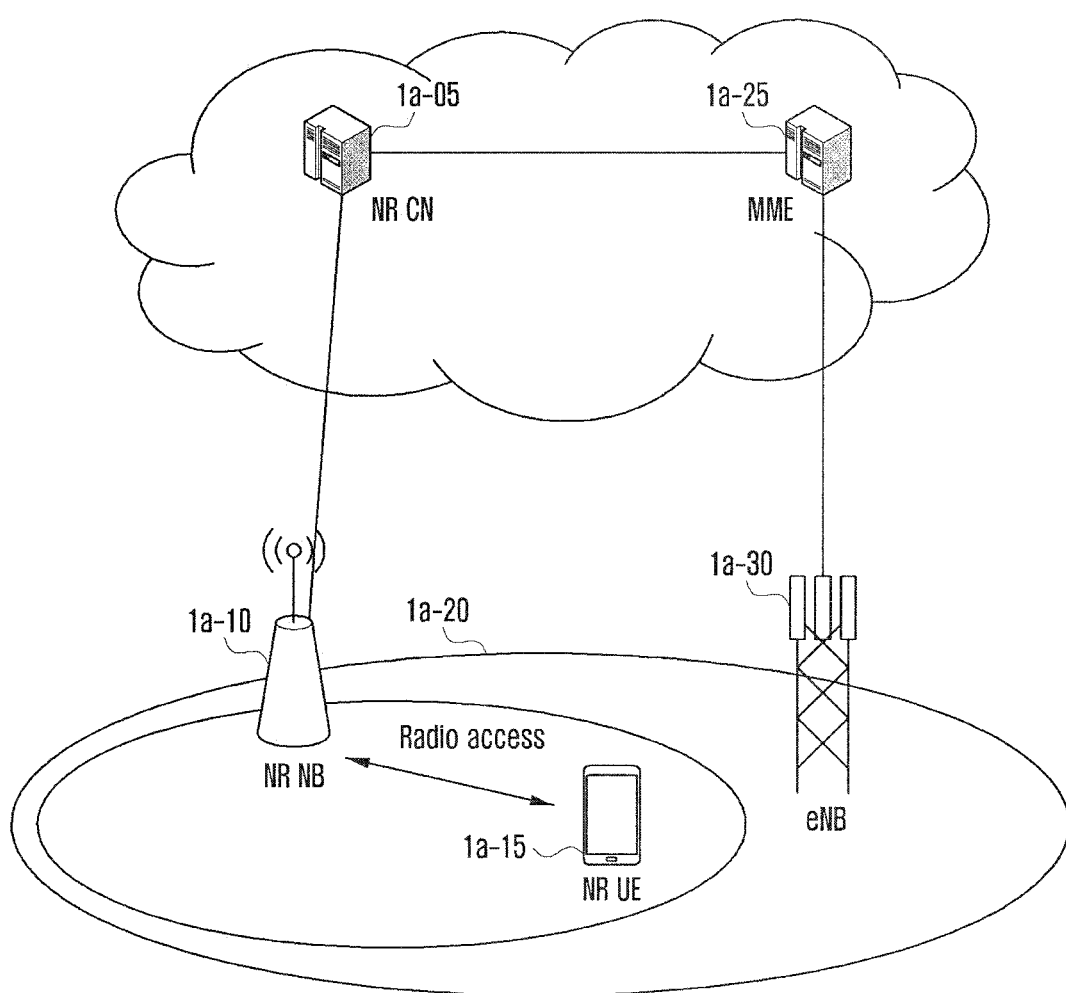
FIG. 1A illustrates a structure of a next-generation mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

In accordance with an aspect of the disclosure, a method of indicating an SP SRS as a reference signal by a terminal is provided. The method includes receiving, from a base station, information for a sounding reference signal (SRS) configuration, receiving, from the base station, a medium access control (MAC) control element (CE) for activating a semi-persistent (SP) SRS, and transmitting, to the base station, an SRS on a first cell based on the information for the SRS configuration and the MAC CE for activating the SP SRS, wherein the MAC CE for activating the SP SRS includes an indicator for indicating whether serving cell information and bandwidth part (BWP) information for a reference signal associated with spatial relationship are present.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more central processing units (CPUs) within a device or a security multimedia card.

First Embodiment

Hereinafter, an operating principle of the disclosure will be described with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification. In the following description, terms for identifying an access node, terms referring to network entities, terms referring to messages, terms referring to interfaces between network entities, and terms referring to various pieces of identification information are used for convenience of description. Therefore, the disclosure is not limited by the terminologies provided below, and other terms that indicate subjects having equivalent technical meanings may be used.

For convenience of description, the disclosure uses terms and names defined in a 3rd-generation partnership project, long-term evolution (3GPP LTE) standard or terms and names changed on the basis thereof. However, the disclosure is not limited to the terms and names and may be equally applied to a system according to another standard.

FIG. 1A illustrates a structure of a next-generation mobile communication system according to an embodiment of the disclosure.

Referring to FIG. 1A, a radio access network (RAN) of the next-generation mobile communication system may include a next-generation evolved Node B (eNB) (NR gNB) or new radio node B (NR NB) 1a-10 and an NR core network (NR CN) node 1a-05. A terminal or a new radio user equipment (hereinafter referred to as a NR UE, a UE, or a terminal) 1a-15 may access an external network 1a-35 via the NR NB 1a-10 and the NR CN node 1a-05.

In FIG. 1A, the NR gNB 1a-10 corresponds to an evolved Node B (eNB) of a conventional LTE system. The NR gNB 1a-10 may be connected to the NR UE 1a-15 through a radio channel and may provide better service than a conventional node B. Since all user traffic is served through a shared channel in the next-generation mobile communication system, a device for collecting and scheduling status information of buffer statuses, available transmission power statuses, and channel statuses of UEs is required, and corresponds to the NR gNB 1a-10. One NR gNB 1a-10 generally controls a plurality of cells. The NR NB may have a bandwidth wider than the conventional maximum bandwidth in order to implement super-high-speed data transmission compared to conventional LTE, and may apply orthogonal frequency-division multiplexing (OFDM) through radio access technology, and may further apply beamforming technology. Further, an AMC (Adaptive Modulation and Coding) scheme of determining a modulation scheme and a channel coding rate is applied depending on the channel status of the UE. The NR CN 1a-05 performs a function of supporting mobility, establishing a bearer, and configuring QoS. The NR CN 1a-05 serves to perform a function of managing the mobility of the UE and perform various control functions, and is connected to a plurality of eNBs. Further, the next-generation mobile communication system may be linked to the conventional LTE system, and the NR CN 1a-05 is connected to an MME 1a-25 through a network interface. The MME 1a-25 is connected to an eNB 1a-30, which is the conventional eNB.

Figure 1B:
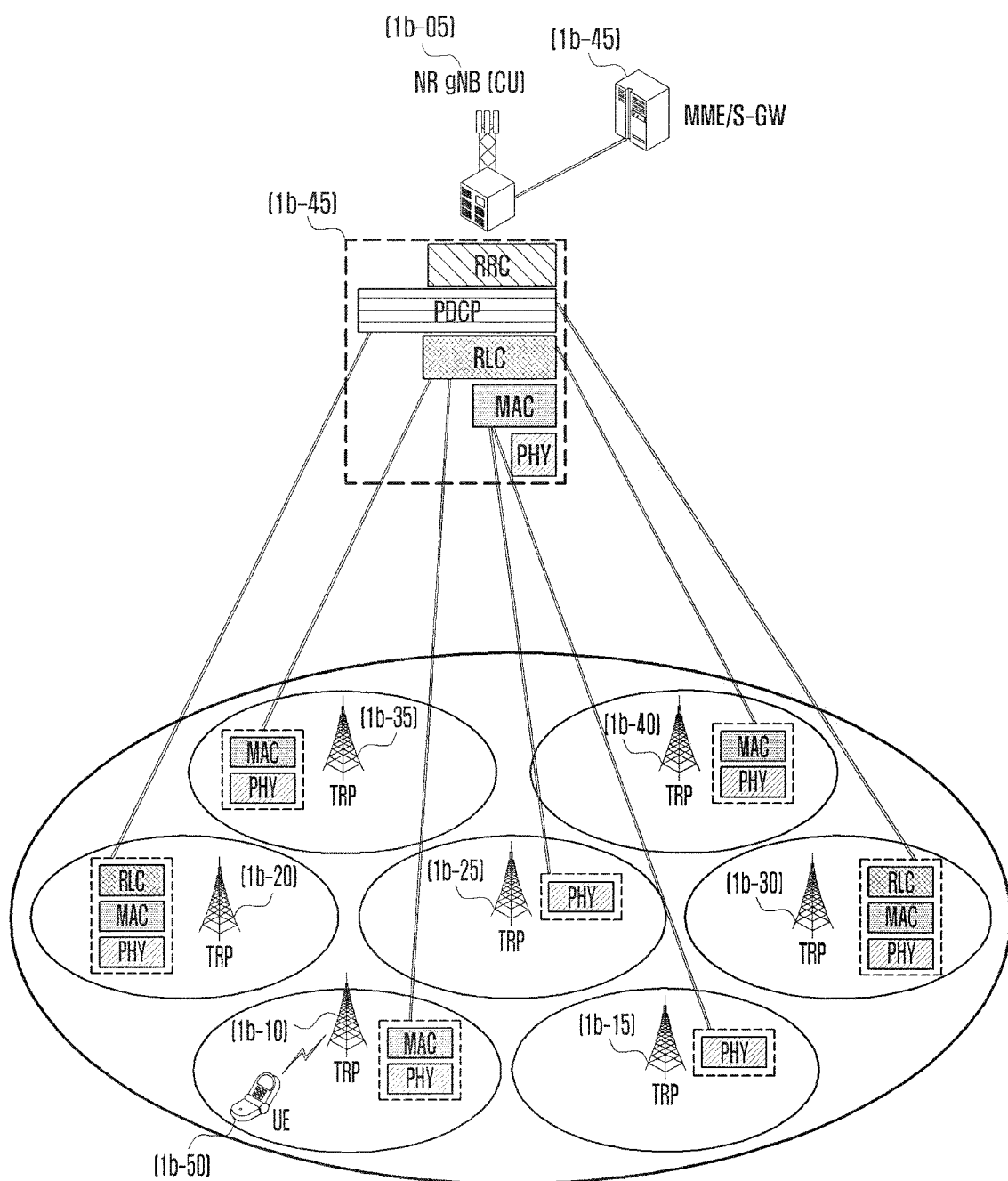
FIG. 1B illustrates a structure of a next-generation mobile communication system according to an embodiment of the disclosure.

FIG. 1B illustrates a structure of a next-generation mobile communication system according to an embodiment of the disclosure.

Referring to FIG. 1B, a cell served by the NR gNB 1b-05 operating based on the beam may include a plurality of transmission reception points (TRPs) 1b-10, 1b-15, 1b-20, 1b-25, 1b-30, 1b-35, and 1b-40. The TRPs 1b-10 to 1b-40 indicate blocks separating some functions of transmitting and receiving physical signals by the LTE eNB of the related art and include a plurality of antennas. The NR gNB 1b-05 may be expressed as a central unit (CU) and the TRP may be expressed as a distributed unit (DU). Functions of the NR gNB 1b-05 and the TRP may be configured by separated layers, such as packet data convergence protocol (PDCP)/ radio link control (RLC)/MAC/PHY layers 1b-45. For example, TRPs 1b-015 and 1b-25 may have only the PHY layer and perform a function of the corresponding layer, TRPs 1b-10, 1b-35, and 1b-40 may have only the PHY layer and the MAC layer and perform a function of the corresponding layers, and TRPs 1b-20 and 1b-30 may have only the PHY layer, the MAC layer, and the RLC layer and perform a function of the corresponding layers. Particularly, the TRPs 1b-10 to 1-40 may use a beamforming technology in which data is transmitted and received by generating narrow beams in various directions through a plurality of transmission/reception antennas. A UE 1b-50 accesses the NR gNB 1b-05 and the external network through the TRPs 1b-10 to 1b-40. In order to provide a service to users, the NR gNB 1b-05 collects and schedules status information, such as buffer statuses, available transmission power statuses, and channel statuses of UEs and supports connection between the UEs and a core network (CN).

Figure 1C:
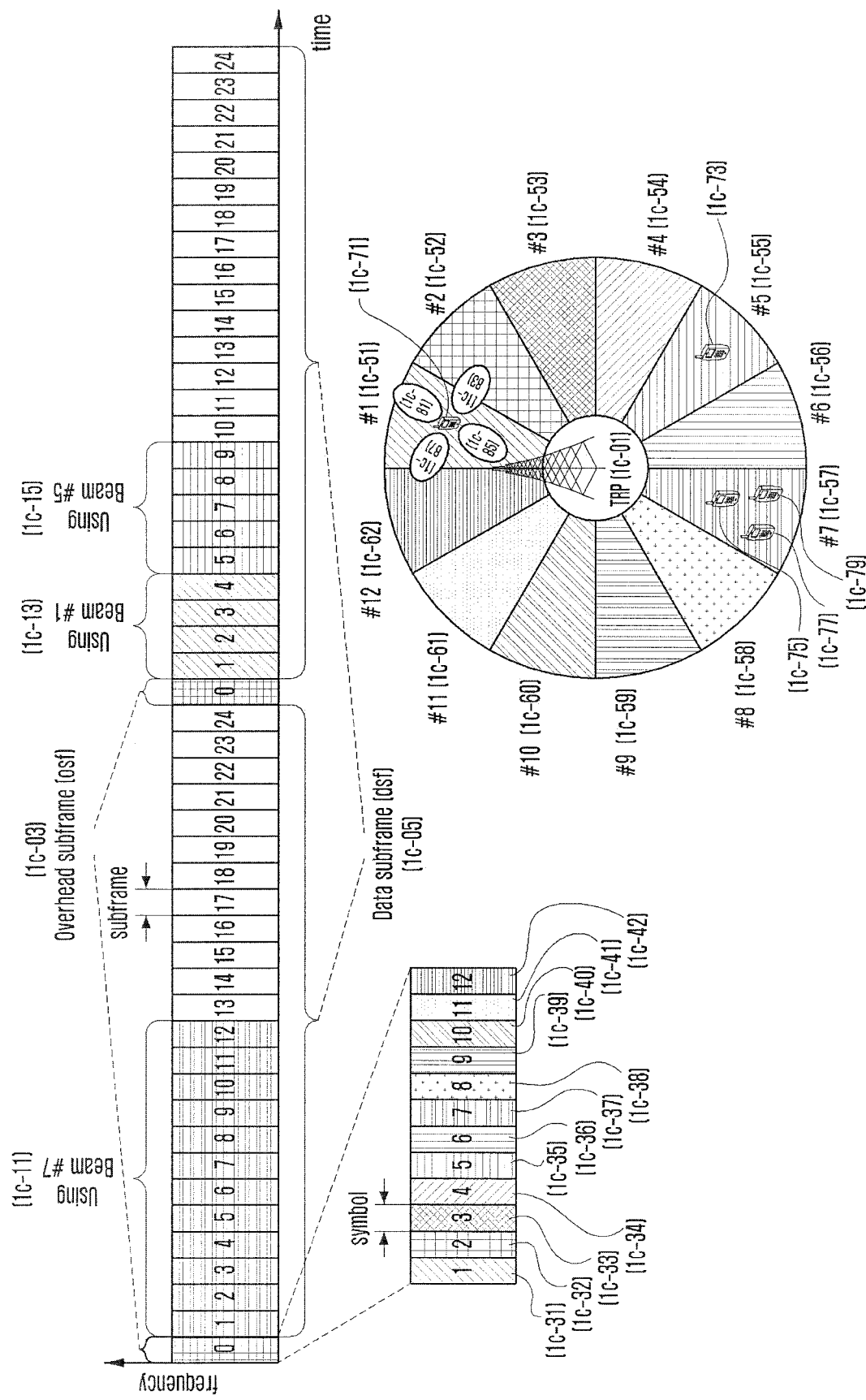
FIG. 1C illustrates a frame structure used by a new radio (NR) system according to an embodiment of the disclosure.

FIG. 1C illustrates a frame structure used by an NR system according to an embodiment of the disclosure.

Referring to FIG. 1C, the NR system aims to realize a higher transmission rate than LTE and considers a scenario of operation in a high frequency in order to secure a wide frequency bandwidth. Particularly, in the high frequency, a scenario of generating a directional beam and transmitting data to the UE at a high data transmission rate may be considered.

Accordingly, during communication with UEs 1c-71, 1c-73, 1c-75, 1c-77, and 1c-79 within a cell, the NR NB or the transmission reception point (TRP) 1c-01 may communicate using different beams. For example, the scenario is assumed in which UE #1 1c-71 communicates through beam #1 1c-51, UE #2 1c-73 communicates through beam #5 1c-55, and UEs #3, #4, and #5 1c-75, 1c-77, and 1c-79 communicate through beam #7 1c-57.

In order to identify the beam through which the UE communicates with the TRP, an overhead subframe (OSF) 1c-03 for transmitting a common overhead signal exists on the time domain. The OSF includes a primary synchronization signal (PSS) for acquiring timing of an OFDM symbol, a secondary synchronization signal (SSS) for detecting a cell identification (ID), an extended synchronization signal (ESS) for acquiring timing of a subframe, and a beam reference signal (BRS) for identifying a beam. Further, system information, a master information block (MIB), or a physical broadcast channel (PBCH) including information required for access of the UE to the system (for example, including a bandwidth of the downlink beam and a system frame number) may be transmitted. Further, the NR NB transmits a reference signal using a different beam for each symbol (or for several symbols) in the OSF. A beam index for identifying each beam may be derived from the reference signal. It is assumed that there are 12 beams from beam #1 1c-51 to beam #12 1c-62 transmitted by the NR NB and that a different beam is swept for every symbol in the OSF in the example figure. For example, each beam may be transmitted for a corresponding symbol in the OSF (for example, beam #1 1c-51 -#12 1c-42 are transmitted in symbol 1c-31-1c-42), respectively, and the terminal may identify which signal is strongest and which beam the signal comes from by measuring the OSF.

The example figure assumes a scenario in which the corresponding OSF repeats every 25 subframes and the remaining 24 subframes are data subframes (hereinafter, referred to as DSF 1c-05) in which general data is transmitted and received. Accordingly, a scenario is assumed in which UEs 3, 4, and 5 1c-75, 1c-77, and 1c-79 communicate in common using beam #7 according to scheduling of the NR gNB as indicated by reference numeral 1c-11, UE 1 1c-71 communicates using beam #1 as indicated by reference numeral 1c-13, and UE 2 1c-73 communicates using beam #5 as indicated by reference numeral 1c-15. The example figure mainly illustrates transmission beams #1 1c-51 to beam #12 1c-62 of the NR gNB, but reception beams of the UE (for example, beams 1c-81, 1c-83, 1c-85, and 1c-87 of UE 1) for receiving the transmission beams of the NR gNB may be additionally considered. In the example figure, UE 1 has four beams 1c-81, 1c-83, 1c-85, and 1c-87 and performs beam sweeping in order to determine which beam has the best reception performance. At this time, when a plurality of beams cannot be simultaneously used, it is possible to find the optimal transmission beam of the NR gNB and the optimal reception beam of the UE by using one reception beam for each OSF and receiving a plurality of OSFS corresponding to the number of reception beams.

Figure 1D:
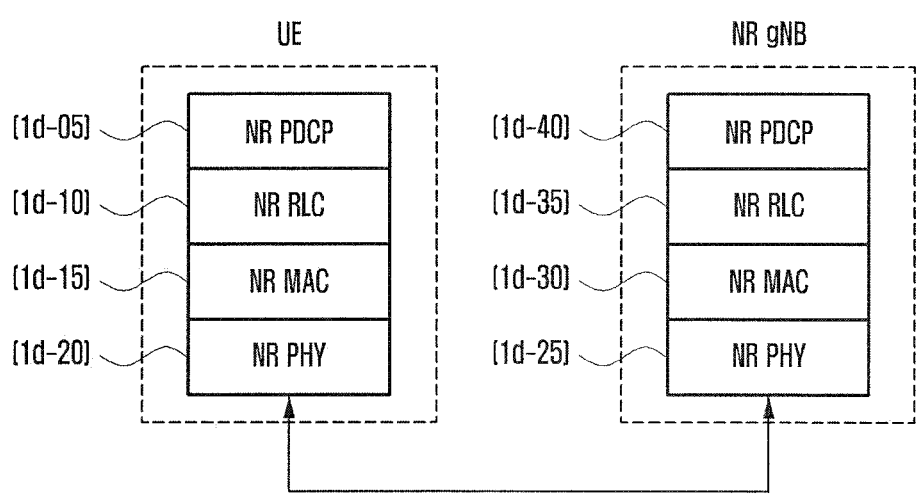
FIG. 1D illustrates a wireless protocol structure of a next-generation mobile communication system according to an embodiment of the disclosure.

FIG. 1D illustrates a wireless protocol structure of a next-generation mobile communication system according to an embodiment of the disclosure.

Referring to FIG. 1D, the wireless protocol of the next-generation mobile communication system includes NR PDCPs 1d-05 and 1d-40, NR RLCs -10 and 1d-35, and NR MACs 1d-15 and 1d-30 in the UE and the NR NB. The main functions of the NR PDCP 1d-05 or 1d-40 may include some of the following functions.

Header compression and decompression function (Header compression and decompression: robust header compression (ROHC) only)
User data transmission function
Sequential delivery function (In-sequence delivery of upper layer PDUs)
Reordering function (PDCP PDU reordering for reception)
Duplicate detection function (Duplicate detection of lower layer SDUs)
Retransmission function (Retransmission of PDCP SDUs)
Ciphering and deciphering function (Ciphering and deciphering)
Timer-based SDU removal function (Timer-based SDU discard in uplink)

The reordering function of the NR PDCP device is a function of sequentially reordering PDCP PDUs received from a lower layer based on a PDCP sequence number (SN), and may include a function of sequentially transferring the reordered data to a higher layer, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 1d-10 or 1d-35 may include some of the following functions.

Data transmission function (Transfer of upper layer PDUs)
Sequential delivery function (In-sequence delivery of upper layer PDUs)
Non-sequential delivery function (Out-of-sequence delivery of upper layer PDUs)
ARQ function (Error correction through ARQ)
Concatenation, segmentation, and reassembly function (Concatenation, segmentation and reassembly of RLC SDUs)
Re-segmentation function (Re-segmentation of RLC data PDUs)
Reordering function (Reordering of RLC data PDUs)
Duplicate detection function (Duplicate detection)
Error detection function (Protocol error detection)
RLC SDU deletion function (RLC SDU discard)
RLC re-establishment function (RLC re-establishment)

The sequential delivery function (In-sequence delivery) of the NR RLC device is a function of sequentially transferring RLC SDUs received from a lower layer to a higher layer, and may include, when one original RLC SDU is divided into a plurality of RLC SDUs and then received, a function of reassembling and transmitting the RLC SDUs, a function of reordering the received RLC PDUs based on an RLC SN or a PDCP SN, a function of recording RLC SDUs lost due to the reordering, a function of reporting statuses of the lost RLC SDUs to a transmitting side, a function of making a request for retransmitting the lost RLC SDUs, if there is a lost RLC SDU, a function of sequentially transferring only RLC SDUs preceding the lost RLC SDU to the higher layer if a predetermined timer expires even though there is a lost RLC SDU, a function of sequentially transferring all RLC SDUs received before the timer starts to the higher layer, or, if a predetermined timer expires even though there is a lost RLC SDU, a function of sequentially transferring all RLC SDUs received up to that point in time to the higher layer. Further, the NR RLC device may process the RLC PDUs sequentially according to a reception order thereof (according to an arrival order regardless of a serial number or a SN) and transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MAC 1d-15 and 1d-30 may be connected to a plurality of NR RLC layer devices configured in one device, and the main functions of the NR MAC may include some of the following functions.

Mapping function (Mapping between logical channels and transport channels)

Multiplexing and demultiplexing function (Multiplexing/ demultiplexing of MAC SDUs)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The PHY layers 1d-20 and 1d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Although not illustrated, there is a radio resource control (RRC) layer above the PDCP layer of each of the UE and the NR gNB, and the RRC layer may transmit and receive an access- and measurement-related configuration control message in order to control radio resources.

When activation/deactivation of a semi-persistent sounding reference signal (SP SRS) in a next-generation mobile communication system is indicated, a beam through which the corresponding SP SRS is transmitted, that is, a QCLed beam, may be indicated, and thus the UE and the NR gNB perform an operation of transmitting and receiving the SP SRS through beams radiated in appropriate directions in the disclosure. The following drawing illustrates an operation of generally performing activation and deactivation of the SP SRS through a MAC CE.

Figure 1E:
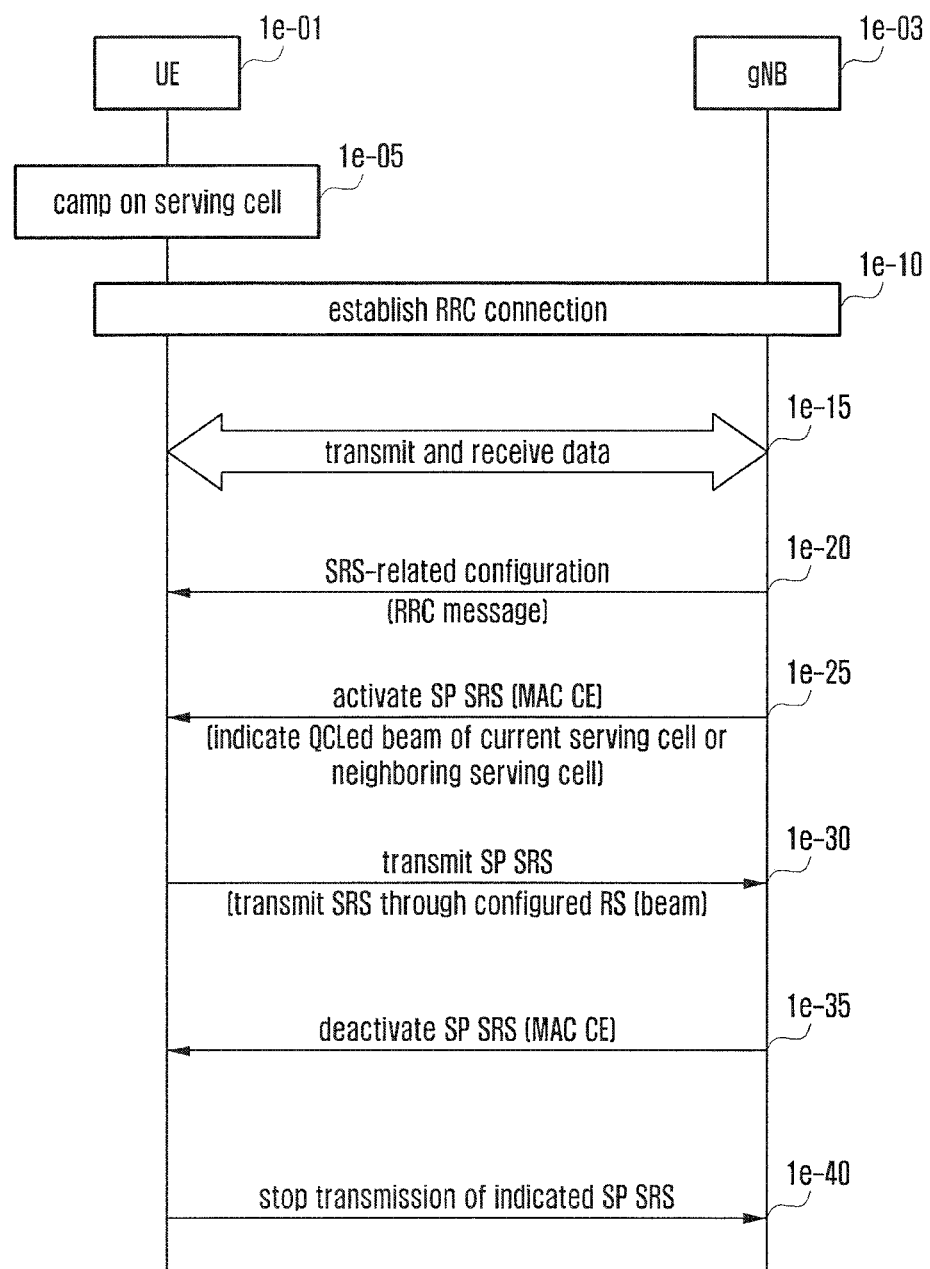
FIG. 1E illustrates a case in which network triggering beam switching through a medium access control (MAC) control element (CE) is successfully performed according to an embodiment of the disclosure.

FIG. 1E illustrates an operation of activating/deactivating a semi-persistent sounding reference signal according to an embodiment of the disclosure.

Referring to FIG. 1E, a UE 1e-01 in an idle mode (or RRC_IDLE) may discover an appropriate cell and camp on the corresponding gNB 1e-03 at operation 1e-05, and may access the gNB 1e-03 for the reason of generation of data to be transmitted at operation 1e-10. In the idle mode, the UE 1e-01 is not connected to the network to save power, so the UE 1e-01 cannot transmit data. In order to transmit data, the UE 1e-01 is required to transition to a connected mode (RRC_CONNECTED). "Camping on" means that the UE 1e-01 is receiving a paging message in order to determine whether data is received through downlink while staying in the corresponding cell. When the UE 1e-01 successfully performs access to the gNB 1e-03, the UE 1e-01 transitions to the connected mode (RRC_CONNECTED) and the UE 1e-01 in the connected mode can transmit and receive data to and from the gNB 1e-03 at operation 1e-15.

In the RRC-connected state, the gNB 1e-03 transmits configuration information (SRS-Config) related to a sounding reference signal (SRS) to the UE 1e-01 through an RRC message at operation 1e-20. The RRC message contains configuration information of a plurality of SRS resource sets. The SRS resource set may be configured to be at least one of periodic, semi-persistent, and aperiodic, and a plurality of SRS resources may be configured in the corresponding SRS resource set. The SRS resources are included in the SRS resource set and thus follow the configured transmission type (periodic, semi-periodic, or aperiodic). Parameters for SRS transmission may be provided to each SRS resource through RRC configuration (SRS-Resource), and particularly, a reference signal indicating spatial relation for actually transmitting the corresponding SRS may be indicated. The indicator may select one of a synchronization signal block (SSB), a channel state information-reference signal (CSI-RS), and an SRS from spatialRelationInfo, and may indicate the reference signal beam at which the SRS is actually QCLed by adding an index of the corresponding type. This may be a method of specifying the type and direction of the beam through which the corresponding SRS is actually transmitted.

More particularly, at operation 1e-25, the gNB may indicate activation and deactivation of the SRS resource set in which the SP SRS is configured through the MAC CE. The MAC CE includes a serving cell ID in which the SRS resource set is configured, a BWP ID, an SRS resource set ID, and an indicator for indicating whether there is a supplementary uplink (SUL), and also includes type and index information of the QCLed reference signal. The disclosure proposes an operation of specifying the serving cell indicating the QCLed reference signal and the BWP ID. To this end, the UE 1e-01 may transmit the SRS for the SRS resource set configured in the current serving cell through a resource type and a beam direction configured in another neighboring cell, and the gNB 1e-03 may more flexibly transmit and receive the SRS. At operation 1e-30, the UE 1e-01 transmits the SP SRS configured by the gNB 1e-03. The gNB 1e-03 sets the SP SRS MAC CE as deactivated and transmits the SP SRS MAC CE to the UE 1e-01 in order to stop transmission of the corresponding SP SRS at an appropriate time after receiving the SP SRS in 1e-35. Upon receiving the MAC CE from the gNB, the UE 1e-03 stops transmitting corresponding SP SRS resources at operation 1e-40.

Figure 1F:
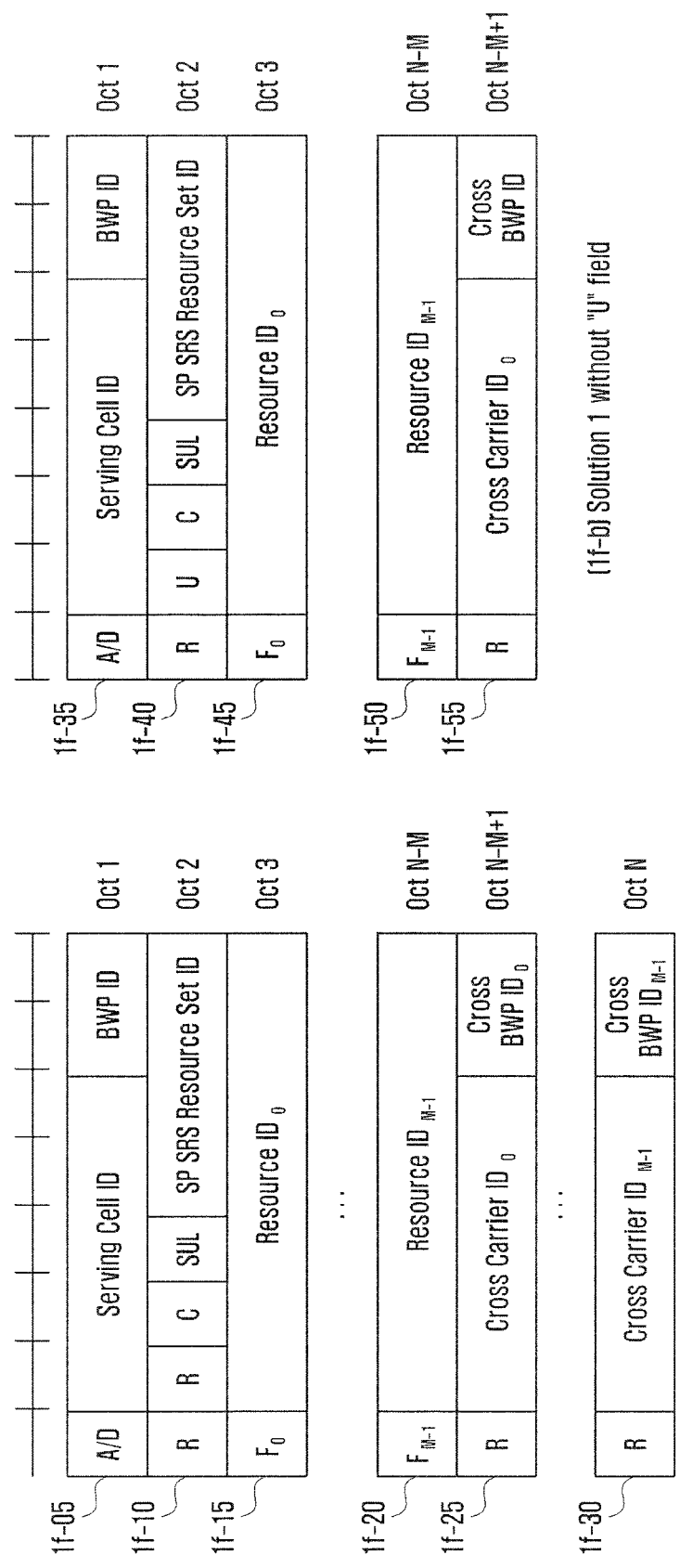
FIG. 1F illustrates MAC CE format method 1 of configuring a reference signal of a neighboring cell as a beam of a semi-persistent sounding reference signal according to an embodiment of the disclosure.

FIG. 1F illustrates MAC CE format method 1 of configuring a reference signal of a neighboring cell as a beam of a semi-persistent sounding reference signal according to an embodiment of the disclosure.

Referring to FIG. 1F, a method of configuring a reference signal of a neighboring cell as a beam of a semi-persistent sounding reference signal is illustrated by expanding the SP SRS activation/deactivation MCE CE of the related art. For example, an index of the QCLed neighboring cell and an indicator for indicating a BWP ID are additionally provided only when SRS transmission is QCLed. The structure of the SP SRS activation/deactivation MAC CE provided by the current NR MAC standard and a newly added field will be described.

In Solution 1 without "U" field (1f-a), with respect to SRS resources included in the indicated SP SRS resource set, the first method of the related art of expanding the SP SRS MAC CE provides cross-carrier indication to every QCLed reference resource. "Cross-carrier indication" means that the QCLed reference signal for the SRS resources indicated by the MAC CE is directed to a neighboring serving cell, rather than to the current serving cell. In 1f-05, there is an A/D field indicating activation or deactivation of the SP SRS, and indicators indicating the serving cell in which the corresponding SP SRS resource set is configured and a BWP ID are included. In 1$f$-10, an identifier indicating an ID of the SP SRS resource set may be included, and a SUL indicator and a newly defined "C" field may be used, which indicates whether cross-carrier indication is configured for the SRS resources. When the corresponding field is set to "1", fields indicating a serving cell ID and a BWP ID of the spatial relation reference signal are added, like in 1$f$-25 and 1$f$-30. When the corresponding field is set to "0", the additional fields, such as 1$f$-25 and 1$f$-30, are omitted. In 1$f$-15 and 1$f$-20, a type and an indicator for indicating the QCLed reference signal for the SRS resources are included. The type of the spatial relation reference signal may be one of SSB, CSI-RS, and SRS, and a 1-bit type field and a 1-bit most significant bit of a resource ID are used to indicate the signal type. Further, the resource ID is a predetermined type of reference signal ID.

When SRS resources in the SP SRS resource set have a common value because the number of cross-carrier indication serving cells is one, the second method of the related art of expanding the SP SRS MAC CE adds a field indicating the same and corresponding information, as in solution 1 with "U" field (1$f$-$b$). Compared to solution 1 without "U" field 1$f$-$a$, it is possible to reduce the overhead of a repeated octet for a plurality of cross carrier indications through a new 1-bit field. In 1$f$-35, there is an A/D field indicating activation or deactivation of the SP SRS and indicators indicating a serving cell in which the corresponding SP SRS resource set is configured and a BWP ID is included. At operation 1$f$-40, an indicator for indicating the ID of the SP SRS resource set is included, and a "C" field may be used, and thus operation is performed in the same way as described above. For example, when the corresponding field is set to "1", fields indicating a serving cell ID and a BWP ID of the spatial relation reference signal are added, like in 1$f$-25, 1$f$-30, and 1$f$-55. When the corresponding field is set to "0", the additional fields, such as 1$f$-25 and 1$f$-30 are omitted. Further, a newly defined "U" field may exist in the octet 1$f$-40 and may be used in the case in which a serving cell and a BWP ID of a plurality of reference signals QCLed only when the "C" field is set to "1" are indicated as a neighboring common serving cell and a BWP. For example, when the "U" field is set to "1", as illustrated in 1$f$-55, 1 byte of cross-carrier indication information is added. When the "U" field is set to "0", the corresponding cross-carrier indication information may be added to every QCLed reference signal, as in solution 1 without "U" field 1$f$-$a$. In 1$f$-45 and 1$f$-50, a type and an indicator for indicating the QCLed reference signal for the SRS resources are included. The type of the spatial relation reference signal may be one of SSB, CSI-RS, and SRS, and a 1-bit type field and a 1-bit MSB of a resource ID are used to indicate the signal type. Further, the resource ID is a predetermined type of reference signal ID. 1$f$-55 includes indicators indicating the serving cell and the BWP in which the reference signals indicated in 1$f$-45 and 1$f$-50 are configured.

Figure 1G:
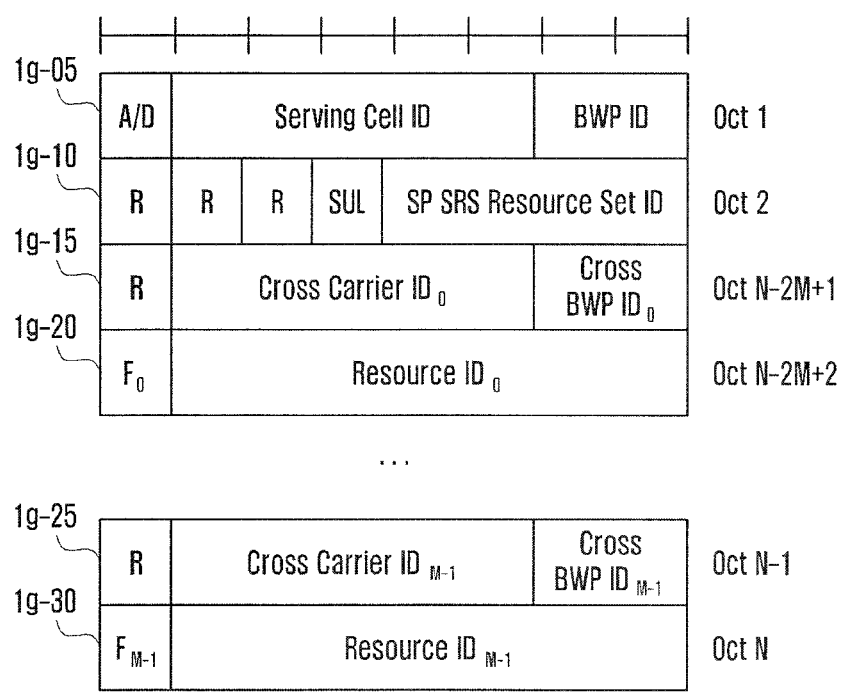
FIG. 1G illustrates MAC CE format method 2 of configuring a reference signal of a neighboring cell as a beam of a semi-persistent sounding reference signal according to an embodiment of the disclosure.

FIG. 1G illustrates MAC CE format method 2 of configuring a reference signal of a neighboring cell as a beam of a semi-persistent sounding reference signal according to an embodiment of the disclosure.

Referring to FIG. 1G, a method of using a new MAC CE is illustrated for configuring a reference signal of a neighboring cell as a beam of a semi-persistent sounding reference signal separately from the SP SRS activation/deactivation MAC CE of the related art. For example, only when the SRS transmission is QCLed, the newly proposed MAC CE (hereinafter referred to as an SP SRS activation/deactivation cross-carrier indication MAC CE) is used without using the previous SP SRS activation/deactivation MAC CE. In the MAC CE, an index of the QCLed neighboring cell and an indicator for indicating a BWP ID are provided. Basically, since the previous SP SRS activation/deactivation MAC CE is used without change, a MAC CE distinguished therefrom through a logical channel identity (LCID) is separately needed, and the structure thereof will be described below.

In 1$g$-05, there is an A/D field indicating activation or deactivation of the SP SRS, and indicators indicating a serving cell in which the corresponding SP SRS resource set is configured and a BWP ID are included. In 1$g$-10, an identifier indicating the ID of the SP SRS resource set is included and an SUL indicator is included. Thereafter, QCLed beam information for the SP SRS resources included in the SRS resources may be included in the indicated SP SRS resource set. Cross-carrier serving cell ID and BWP ID information of the corresponding QCLed beam are included in 1$g$-15 and a type and an index of the corresponding beam are included in 1$g$-20. 1$g$-15 and 1$g$-20 exist as a set of the configuration for one reference signal.

Thereafter, information on the QCLed reference signal like 1$g$-15 and 1$g$-20 are added by the number (M) of SP SRS resources included in the SP SRS resource set. In Solution 2 field (1$g$-$a$), as in 1$g$-25 and 1$g$-30, M pieces of set information are added to the corresponding MAC CE. The type of the spatial relation reference signal of 1$g$-20 and 1$g$-30 may be one of SSB, CSI-RS, and SRS, and a type field of 1 bit and the MSB of 1 bit of a resource ID are used to indicate the signal type. Further, the resource ID is a predetermined type of reference signal ID.

Figure 1H:
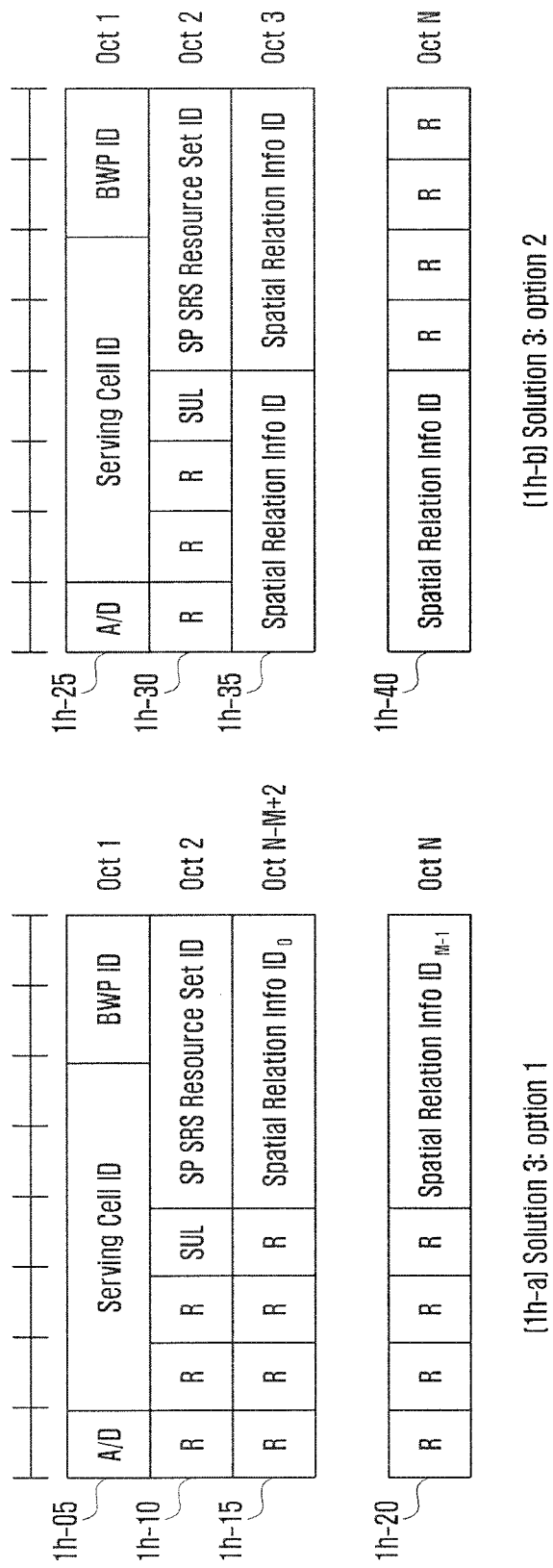
FIG. 1H illustrates MAC CE format method 3 of configuring a reference signal of a neighboring cell as a beam of a semi-persistent sounding reference signal according to an embodiment of the disclosure.

FIG. 1H illustrates MAC CE format method 3 of configuring a reference signal of a neighboring cell as a beam of a semi-persistent sounding reference signal according to an embodiment of the disclosure.

Referring to FIG. 1H, a method of using a new MAC CE is illustrated for configuring a reference signal of a neighboring cell as a beam of a semi-persistent sounding reference signal separately from the SP SRS activation/deactivation MAC CE of the related art. For example, only when the SRS transmission is QCLed, the newly proposed MAC CE (hereinafter referred to as an SP SRS activation/deactivation cross-carrier indication MAC CE) is used, rather than using the previous SP SRS activation/deactivation MAC CE. The difference from the MAC CE format method 2 is that the MAC CE format method 3 provides the corresponding configuration through RRC, and an index is indicated by the MAC CE without including information indicating the QCLed beam into the MAC CE. Basically, since the previous SP SRS activation/deactivation MAC CE is used without change, a separate MAC CE distinguished therefrom through an LCID is needed, and the structure thereof will be described below.

In 1$h$-05, there is an A/D field indicating activation or deactivation of the SP SRS, and indicators indicating the serving cell in which the corresponding SP SRS resource set is configured and a BWP ID are included. In 1$h$-10, an identifier indicating the ID of the SP SRS resource set is included, and an SUL indicator is included. Thereafter, QCLed beam information for the SP SRS resources included in the SRS resources may be included in the indicated SP SRS resource set. In Solution 3: option 1 field (1$h$-$a$), the distinguishing feature of the embodiment is that QCLed reference signal information and cross-carrier indication are indicated through a spatial relation info ID in 1$h$-15 and 1$h$-20. For example, all of the serving cell ID of the QCLed reference signal, the BWP IP, and the reference signal type and ID are configured for SP SRS resources through RRC configuration, which is indicated by a spatial relation inform ID. It is assumed that the size of the corresponding spatial relation info may be configured as a particular constant and may be configured as 16 in the embodiment. The spatial relation info can be configured such that a plurality of pieces of spatial relation info is included in 1 octet like in 1$h$-$b$ in order to reduce the size of the MAC CE according to the size of the spatial relation info, although the corresponding information is the same.

Figure 1I:
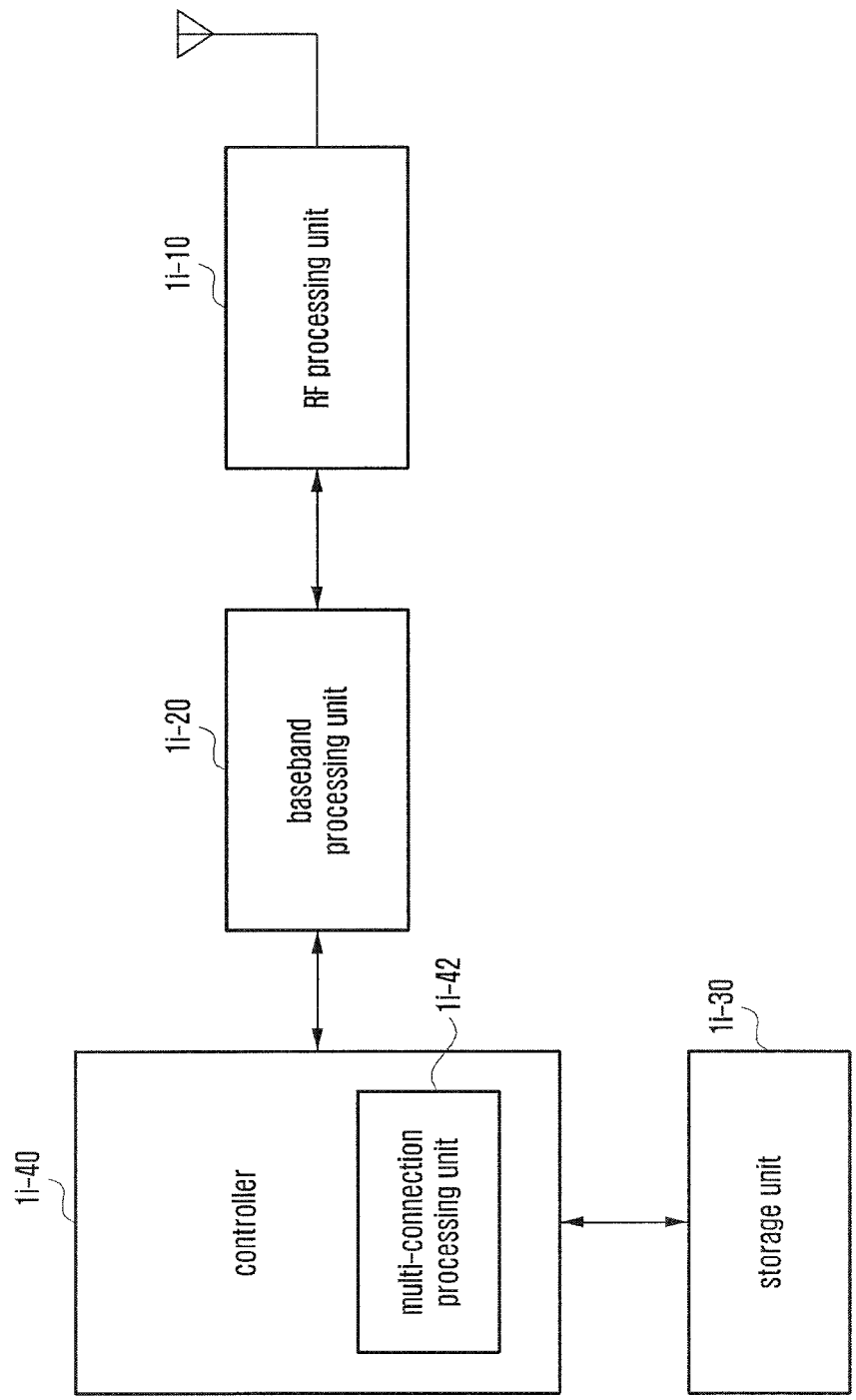
FIG. 1I is a block diagram illustrating an internal structure of a UE according to an embodiment of the disclosure.

FIG. 1I is a block diagram illustrating an internal structure of a UE according to an embodiment of the disclosure.

Referring to FIG. 1I, the UE includes a radio-frequency (RF) processing unit 1$i$-10, a baseband processing unit 1$i$-20, a storage unit 1$i$-30, and a controller 1$i$-40.

The RF processing unit 1$i$-10 performs a function for transmitting and receiving a signal through a wireless channel, such as band conversion and amplification of a signal. For example, the RF processing unit 1$i$-10 up-converts a baseband signal provided from the baseband processing unit 1$i$-20 into an RF band signal, transmits the RF band signal through an antenna, and then down-converts the RF band signal received through the antenna into a baseband signal. For example, the RF processing unit 1$i$-10 may include a transmission filter, a reception filter, an amplifier, a mixer, an oscillator, a digital-to-analog convertor (DAC), an analog-to-digital convertor (ADC), and the like. Although FIG. 1I illustrates only one antenna, the UE may include a plurality of antennas. The RF processing unit 1$i$-10 may include a plurality of RF chains. Moreover, the RF processing unit 1$i$-10 may perform beamforming. For the beamforming, the RF processing unit 1$i$-10 may control a phase and a size of each signal transmitted/received through a plurality of antennas or antenna elements. The RF processing unit may perform MIMO and receive a plurality of layers when performing the MIMO operation.

The baseband processing unit 1$i$-20 performs a function for conversion between a baseband signal and a bitstream according to a physical-layer standard of the system. For example, when transmitting data, the baseband processing unit 1$i$-20 generates complex symbols by encoding and modulating a transmission bitstream. Further, when receiving data, the baseband processing unit 1$i$-20 reconstructs a reception bitstream by demodulating and decoding a baseband signal provided from the RF processing unit 1$i$-10. For example, in an OFDM scheme, when transmitting data, the baseband processing unit 1$i$-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, when data is received, the baseband processing unit 1$i$-20 divides the baseband signal provided from the RF processing unit 1$i$-10 in units of OFDM symbols, reconstructs the signals mapped to the subcarriers through a fast Fourier transform (FFT) operation, and then reconstructs a reception bitstream through demodulation and decoding.

The baseband processing unit 1$i$-20 and the RF processing unit 1$i$-10 transmit and receive signals as described above. Accordingly, the baseband processing unit 1$i$-20 and the RF processing unit 1$i$-10 may be embodied as a transmitter, a receiver, a transceiver, or a communication unit. Further, at least one of the baseband processing unit 1$i$-20 and the RF processing unit 1$i$-10 may include a plurality of communication modules for supporting a plurality of different radio access technologies. In addition, at least one of the baseband processing unit 1$i$-20 and the RF processing unit 1$i$-10 may include different communication modules for processing signals in different frequency bands. For example, the different communication standards may include a wireless LAN (for example, IEEE 802.11) and a cellular network (for example, LTE). Further, the different frequency bands may include a super-high frequency (SHF) (for example, 2.NRHz, NRhz) band and a millimeter (mm) wave (for example, 60 GHz) band.

The storage unit 1$i$-30 stores data, such as a basic program, an application, and setting information for the operation of the UE. Particularly, the storage unit 1$i$-30 may store information related to a second access node performing wireless communication through a second radio access technology. The storage unit 1$i$-30 provides stored data in response to a request from the controller 1$i$-40.

The controller 1$i$-40 controls the overall operation of the UE. For example, the controller 1$i$-40 transmits and receives a signal through the baseband processing unit 1$i$-20 and the RF processing unit 1$i$-10. The controller 1$i$-40 records data in the storage unit 1$i$-30 and reads the data. To this end, the controller 1$i$-40 may include at least one processor. For example, the controller 1$i$-40 may include a communications processor (CP) that performs control for communication, and an application processor (AP) that controls higher layers, such as an application layer. The controller 1$i$-40 may include a multi-connection processing unit 1$i$-42 for processing information which is a reference for determining whether or not to allow multiple connections to the UE.

Figure 1J:
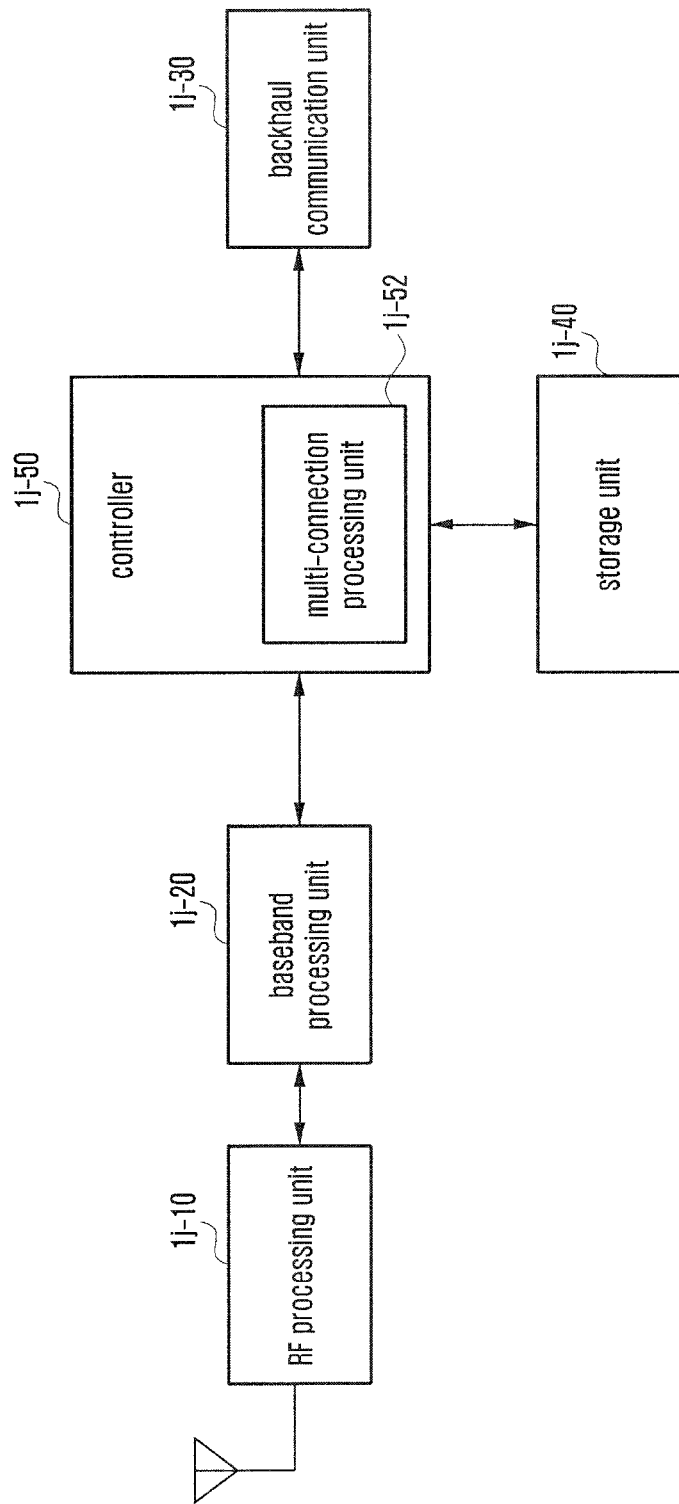
FIG. 1J is a block diagram illustrating a configuration of an NR NB according to an embodiment of the disclosure.

FIG. 1J is a block diagram illustrating a configuration of an NR NB according to an embodiment of the disclosure.

Referring to FIG. 1J, the NR NB includes an RF processing unit 1$j$-10, a baseband processing unit 1$j$-20, a backhaul communication unit 1$j$-30, a storage unit 1$j$-40, and a controller 1$j$-50.

The RF processing unit 1$j$-10 performs a function for transmitting and receiving a signal through a radio channel, such as band conversion and amplification of a signal. For example, the RF processing unit 1$j$-10 up-converts a baseband signal provided from the baseband processing unit 1$j$-20 into an RF band signal, transmits the RF band signal through an antenna, and then down-converts the RF band signal received through the antenna into a baseband signal. For example, the RF processing unit 1$j$-10 may include a transmission filter, a reception filter, an amplifier, a mixer, an oscillator, a DAC, and an ADC. Although FIG. 1J illustrates only one antenna, the first access node may include a plurality of antennas. Further, the RF processing unit 1$j$-10 may include a plurality of RF chains. The RF processing unit 1$j$-10 may perform beamforming. For the beamforming, the RF processing unit 1$j$-10 may control a phase and a size of each of the signals transmitted and received through a plurality of antennas or antenna elements. The RF processing unit may perform a downlink MIMO operation by transmitting one or more layers.

The baseband processing unit 1$j$-20 performs a function of conversion between a baseband signal and a bitstream according to a physical-layer standard of the first radio access technology. For example, when transmitting data, the baseband processing unit 1$j$-20 generates complex symbols by encoding and modulating a transmission bitstream. Further, when receiving data, the baseband processing unit 1$j$-20 reconstructs a reception bitstream by demodulating and decoding a baseband signal provided from the RF processing unit 1$j$-10. For example, in an OFDM scheme, when transmitting data, the baseband processing unit 1$j$-20 may generate complex symbols by encoding and modulating the transmission bitstream, map the complex symbols to subcarriers, and then configure OFDM symbols through an IFFT operation and CP insertion. In addition, when receiving data, the baseband processing unit 1j-20 divides a baseband signal provided from the RF processing unit 1j-10 in units of OFDM symbols, recovers signals mapped with subcarriers through an FFT operation, and then recovers a reception bitstream through demodulation and decoding. The baseband processing unit 1j-20 and the RF processing unit 1j-10 transmit and receive signals as described above. Accordingly, the baseband processing unit 1j-20 and the RF processing unit 1j-10 may be embodied as a transmitter, a receiver, a transceiver, a communication unit, or a wireless communication unit.

The backhaul communication unit 1j-30 provides an interface for communicating with other nodes within the network. For example, the backhaul communication unit 1j-30 converts a bitstream transmitted to another node, for example, a secondary eNB (SeNB) or a CN from a master eNB (MeNB), into a physical signal and converts a physical signal received from the other node into the bitstream.

The storage unit 1j-40 stores data, such as a basic program, an application, or configuration information for the operation of the MeNB. Particularly, the storage unit 1j-40 may store information on a bearer allocated to the access UE and a measurement result reported by the accessed UE. Further, the storage unit 1j-40 may store information which is a reference for determining whether or not to allow multiple connections to the UE. In addition, the storage unit 1j-40 provides stored data in response to a request from the controller 1j-50.

The controller 1j-50 controls the overall operation of the MeNB. For example, the controller 1j-50 transmits and receives a signal through the baseband processing unit 1j-20 and the RF processing unit 1j-10 or through the backhaul communication unit 1j-30. Further, the controller 1j-50 records data in the storage unit 1j-40 and reads the data. To this end, the controller 1j-50 may include at least one processor. Further, the controller 1j-50 may include a multi-connection processing unit 1j-52 for processing information which is a reference for determining whether or not to allow multiple connections to the UE.

Second Embodiment

Hereinafter, the operating principle of the disclosure will be described with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be used below are terms defined in consideration of the functions in the disclosure, and may be different according to users, intentions of the users, or customs. Therefore, the definitions of the terms should be made based on the contents throughout the specification. In the following description, terms for identifying an access node, terms referring to network entities, terms referring to messages, terms referring to interfaces between network entities, and terms referring to various pieces of identification information are used for convenience of description. Therefore, the disclosure is not limited by the terminologies provided below, and other terms that indicate subjects having equivalent technical meanings may be used.

For convenience of description, the disclosure uses terms and names defined in a 3rd-generation partnership project, 3GPP LTE standard or terms and names changed on the basis thereof. However, the disclosure is not limited to the terms and names, and may be equally applied to a system according to another standard.

Figure 2A:
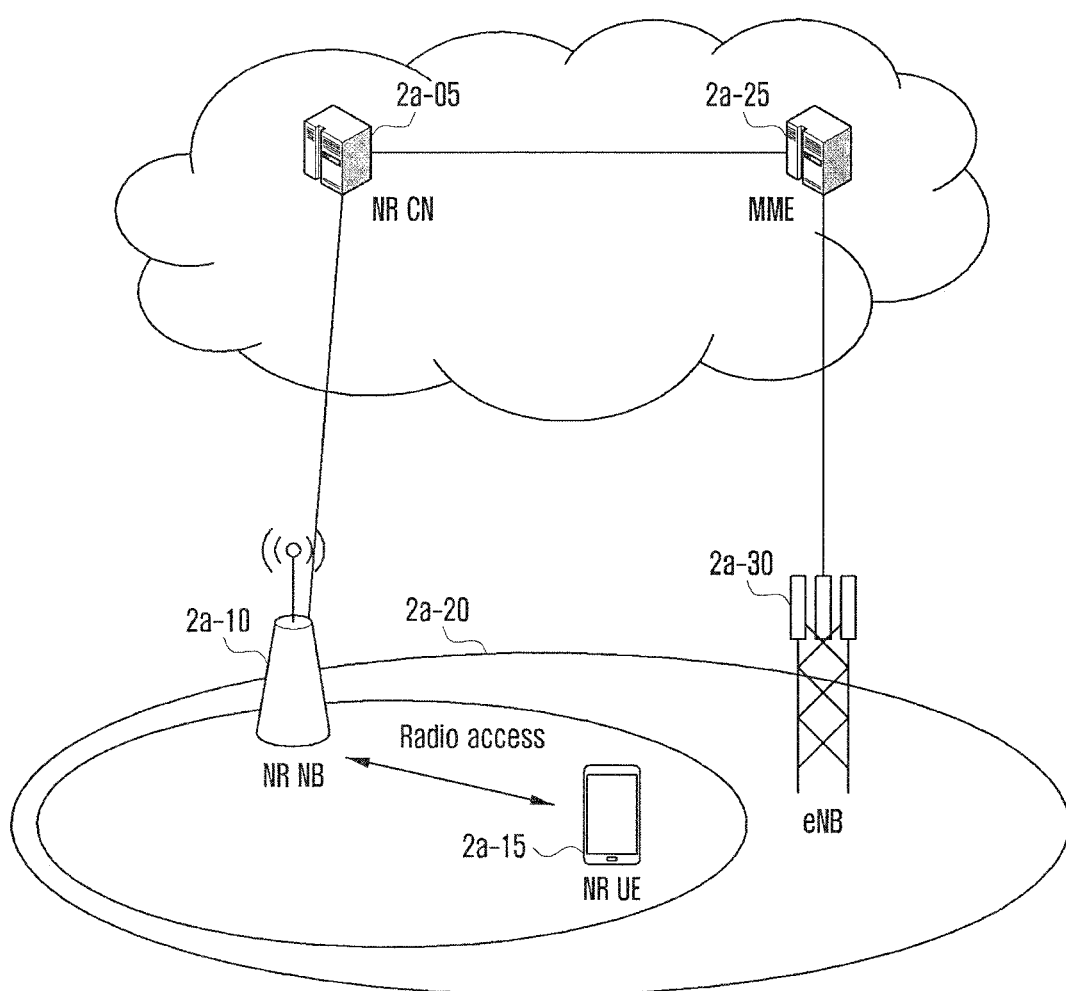
FIG. 2A illustrates a structure of a next-generation mobile communication system according to an embodiment of the disclosure.

FIG. 2A illustrates a structure of a next-generation mobile communication system according to an embodiment of the disclosure.

Referring to FIG. 2A, a RAN of the next-generation mobile communication system includes a next-generation eNB (new radio node B, hereinafter, referred to as NR gNB or NR NB) 2a-10 and a new radio core network (NR CN) 2a-05, as illustrated in FIG. 2A. A user terminal (new radio user equipment, hereinafter, referred to as a NR UE, a UE, or a terminal) 2a-15 accesses an external network through the NR gNB 2a-10 and the NR CN 2a-05.

In FIG. 2A, the NR gNB 2a-10 included in network 2a-20 corresponds to an eNB of an LTE system of the related art. The NR gNB 2a-10 may be connected to the NR UE 2a-15 through a radio channel and may provide better service than a node B of the related art. Since all user traffic is served through a shared channel in the next-generation mobile communication system, a device for collecting and scheduling status information of buffer statuses, available transmission power statuses, and channel statuses of UEs is required, which corresponds to the NR gNB 2a-10. One NR gNB 2a-10 generally controls a plurality of cells. The NR NB may have a bandwidth wider than the maximum bandwidth of the related art in order to implement super-high-speed data transmission compared to LTE of the related art, may apply OFDM through radio access technology, and may further apply beamforming technology. Further, an AMC scheme of determining a modulation scheme and a channel coding rate is applied depending on the channel status of the UE. The NR CN 2a-05 performs a function of supporting mobility, configuring a bearer, and configuring QoS. The NR CN 2a-05 serves to perform a function of managing the mobility of the UE and various control functions and is connected to a plurality of NR NBs. Further, the next-generation mobile communication system may be linked to the LTE system of the related art, and the NR CN 2a-05 may be connected to an MME 2a-25 through a network interface. The MME 2a-25 may be connected to an eNB 2a-30, which is an eNB of the related art.

Figure 2B:
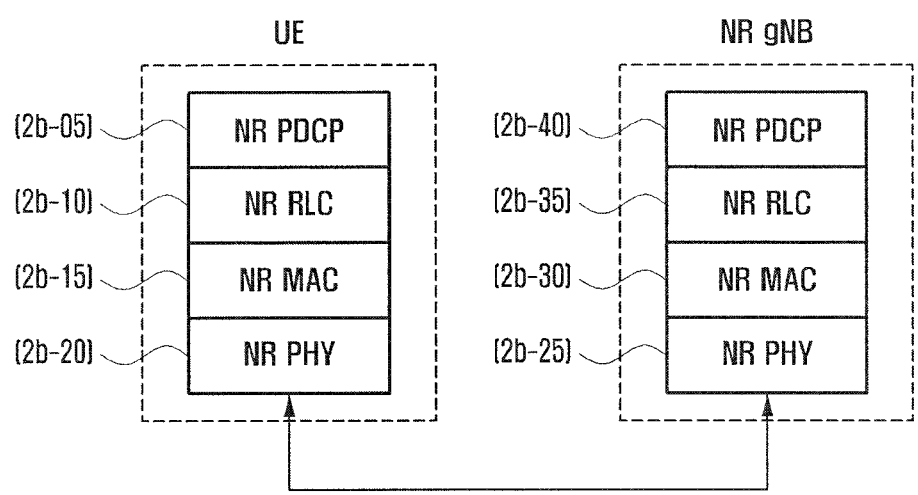
FIG. 2B illustrates a wireless protocol structure of a next-generation mobile communication system according to an embodiment of the disclosure.

FIG. 2B illustrates a wireless protocol structure of a next-generation mobile communication system according to an embodiment of the disclosure.

Referring to FIG. 2B, the wireless protocol of the next-generation mobile communication system includes NR PDCPs 2b-05 and 2b-40, NR RLCs 2b-10 and 2b-35, and NR MACs 2b-15 and 2b-30 in the UE and the NR gNB. The main functions of the NR PDCP 2b-05 or 2b-40 may include some of the following functions.

Header compression and decompression function ((Header compression and decompression: ROHC only)

User data transmission function

Sequential delivery function (In-sequence delivery of upper-layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU removal function (Timer-based SDU discard in uplink)

The reordering function of the NR PDCP device is a function of sequentially reordering PDCP PDUs received from a lower layer based on a PDCP SN, and may include a function of sequentially transferring the reordered data to a higher layer, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 2b-10 or 2b-35 may include some of the following functions.

Data transmission function (Transfer of upper layer PDUs)

Sequential delivery function (In-sequence delivery of upper layer PDUs)

Non-sequential delivery function (Out-of-sequence delivery of upper layer PDUs)

ARQ function (Error correction through ARQ)

Concatenation, segmentation, and reassembly function (Concatenation, segmentation and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs based on an RLC SN or a PDCP SN, a function of recording PDCP PDUs lost due to the reordering, a function of reporting statuses of the lost PDCP PDUs to a transmitting side, a function of making a request for retransmitting the lost PDCP PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. Further, the NR RLC device may process the RLC PDUs sequentially in a reception order thereof (according to an arrival order regardless of a serial number or a SN) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MAC 2b-15 and 2b-30 may be connected to a plurality of NR RLC layer devices configured in one device, and the main functions of the NR MAC may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The PHY layers 2b-20 and 2b-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Although not illustrated, there is a RRC layer above the PDCP layer of each of the UE and the NR gNB, and the RRC layer may transmit and receive an access- and measurement-related configuration control message to control radio resources.

Figure 2C:
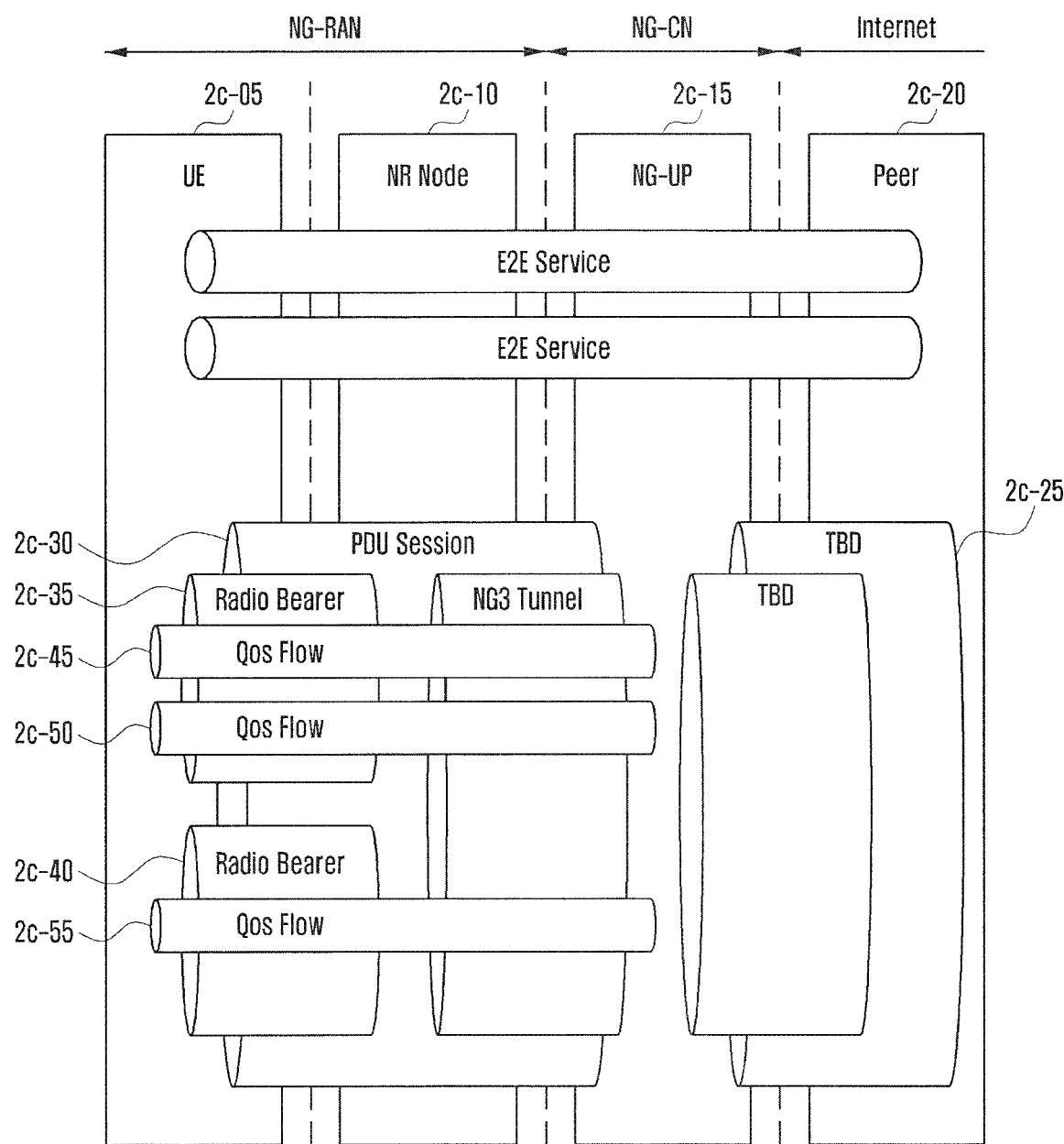
FIG. 2C schematically illustrates an operation from a core network (CN) to a UE for processing a quality of service (QoS) in an NR system according to an embodiment of the disclosure.

FIG. 2C schematically illustrates an operation from a CN to a UE for processing a QoS in an NR system according to an embodiment of the disclosure.

Referring to FIG. 2C, a method of providing end-to-end service for each QoS flow in all operations for supporting an IP service to a UE 2c-05, an NR node (gNB) 2c-10, an NG-UP 2c-15, and an Internet peer 2c-20 in the NR system. At operation 2c-25, for the peer 2c-20 providing an Internet service in which a packet data network (PDN) connection is established, that is, for one PDN, a PDU session may be configured, and at operations 2c-45, 2c-50, and 2c-55, QoS flows may be transmitted through one tunnel up to the NG-CN 2c-15. In the NG-CN 2c-15, one or more PDU sessions may be configured up to the UE, in which case PDU sessions are independently configured as illustrated in the drawing. At operation 2c-30, the gNB 2c-10 receives a packet from the NG-CN 2c-15 and the packet is transmitted through the QoS flow to which the packet belongs. For example, the packet is transmitted according to the rule under which the IP flow is mapped to the QoS flow. At operations 2c-35 and 2c-40, the gNB 2c-10 identifies the DRB to which a particular QoS flow is mapped, and may map and transmit the QoS flow to the UE through the particular DRB according to a mapping rule. At the operation, the gNB 2c-10 may determine the DRB to which the particular QoS flow is mapped.

Figure 2D:
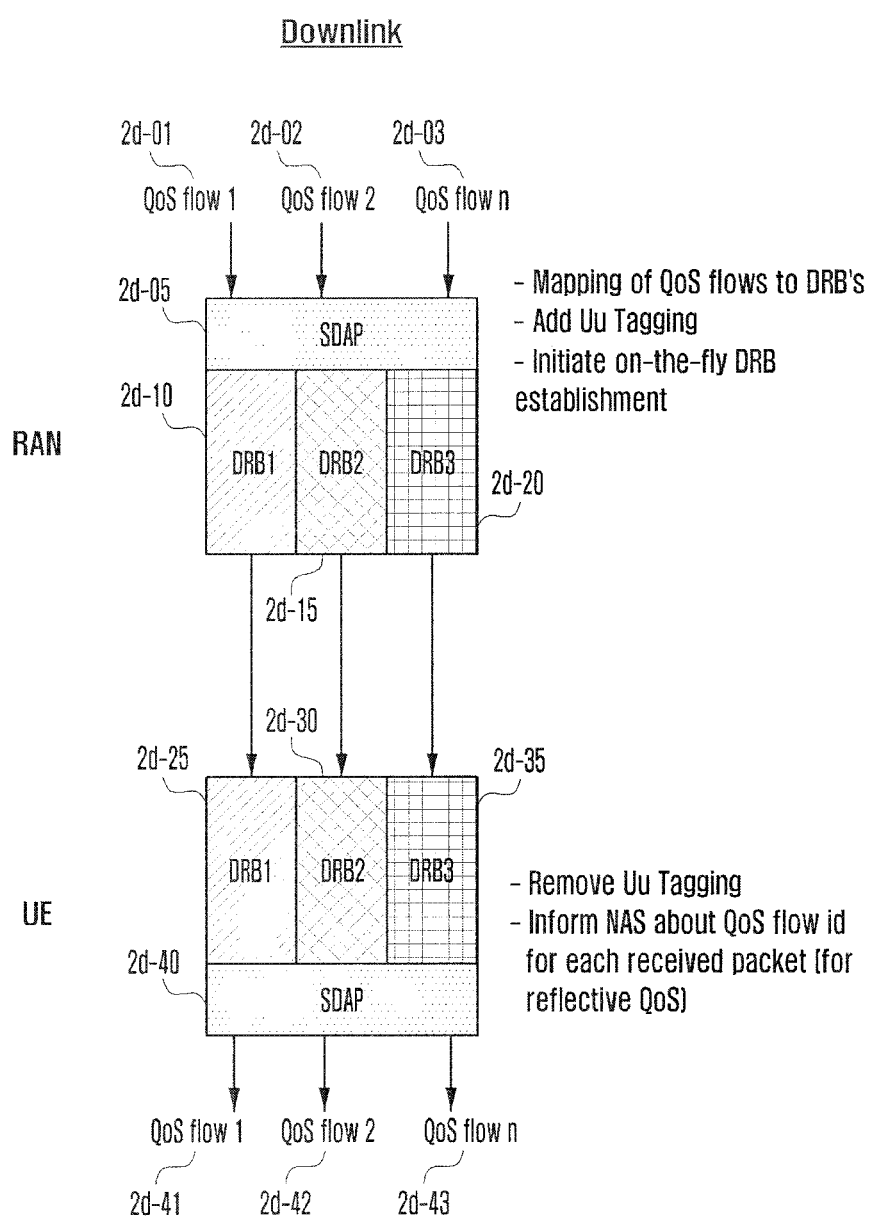
FIGS. 2DA and 2DB illustrate new functions for handling a QoS in an NR system according to an embodiment of the disclosure.
Figure 2D:
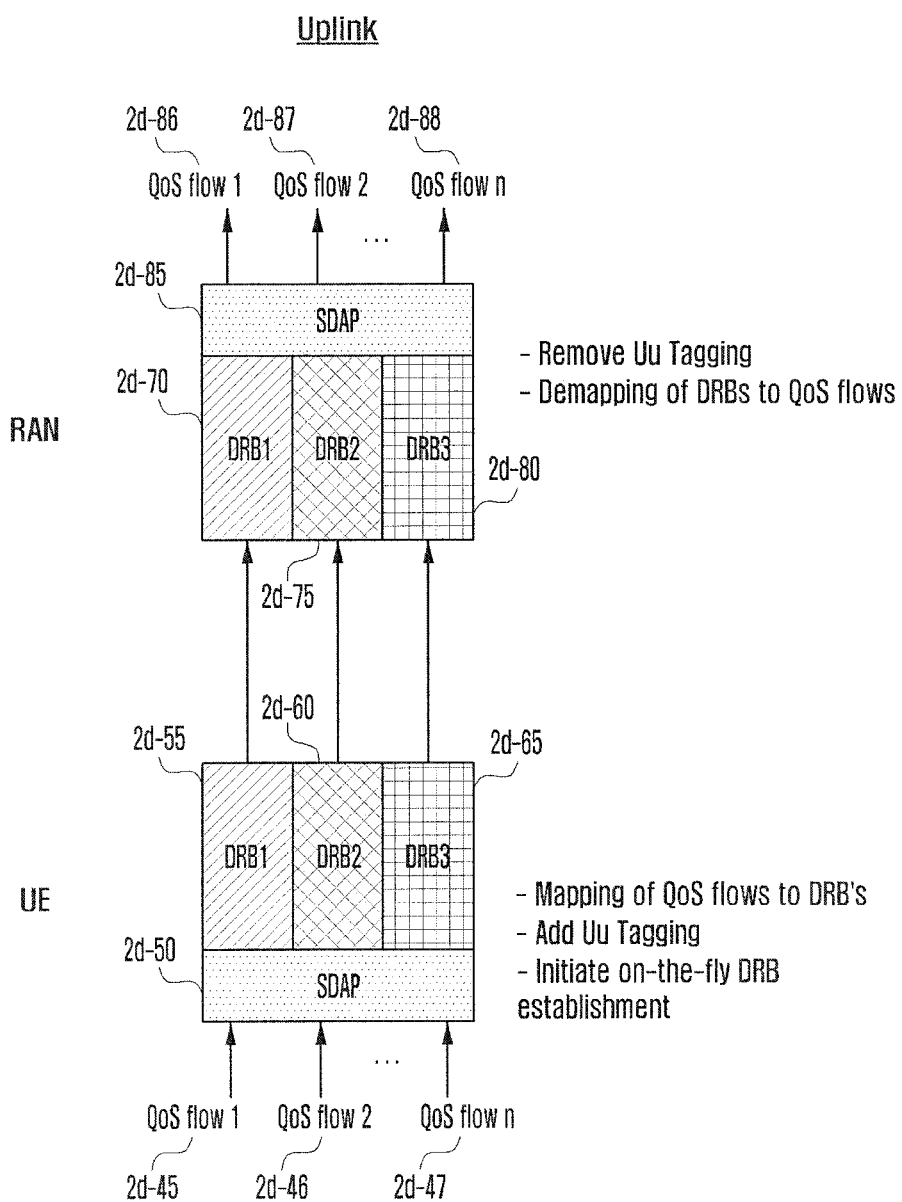

FIGS. 2DA and 2DB illustrate new functions for handling a QoS in the NR system according to an embodiment of the disclosure.

Referring to FIGS. 2DA and 2DB, in the NR system, a user traffic transmission path should be configured according to services requiring different quality of service (QoS), that is, the QoS requirements or IP flow should be controlled according to each service. The NR CN may configure a plurality of packet data unit (PDU) sessions, and each PDU session may include a plurality of IP flows. The NR gNB may map a plurality of QoS flows to a plurality of data radio bearers (DRBs) and simultaneously configure the same. For example, since a plurality of QoS flows 2*d*-01, 2*d*-02, and 2*d*-03 may be mapped to the same DRB or different DRBs 2*d*-10, 2*d*-15, and 2*d*-20 in downlink, it is required to mark a QoS flow ID in a downlink packet in order to distinguish between the QoS flows. Alternatively, DRB mapping may be explicitly configured through an RRC control message. Such a function is not included in the LTE PDCP protocol of the related art, so that a new protocol (service data access protocol (SDAP) 2*d*-05, 2*d*-40, 2*d*-50, or 2*d*-85) should be introduced, or a function of performing the new function should be added to the PDCP. Further, the marking allows the UE to implement a reflective QoS for uplink. The reflective QoS refers to a mapping method of allowing the UE to perform uplink transmission through a DRB through which a downlink packet having a particular flow ID transmitted by the gNB is transmitted, and in order to indicate the reflective QoS, a reflective QoS indicator (RQI) of 1 bit and a reflective QoS flow to DRB mapping indication (RDI) of 1 bit may be included in an SDAP header.

For example, a plurality of QoS flows 2*d*-86, 2*d*-87, and 2*d*-88 may be mapped to the same DRB or different DRBs 2*d*-70, 2*d*-75, and 2*d*-80 in uplink. Explicitly marking the QoS flow ID in the downlink packet corresponds to a simple method by which an access stratum (AS) of the UE provides the information to a NAS of the UE. A method of mapping IP flows to DRBs in downlink may be performed through two operations below.

1. NAS level mapping (RQI): IP flow→QoS flow
2. AS level mapping (RDI): QoS flow→DRB In downlink reception of the UE, QoS flow mapping information and the existence or nonexistence of the reflective QoS operation may be detected for each DRB 2*d*-25, 2*d*-30, or 2*d*-35 and the corresponding information of QoS flows 2*d*-41, 2*d*-42, and 2*d*-43 may be transmitted to the NAS. For example, when the RQI and the RDI are set to "1" in the SDAP header of the received data packet, it means that the NAS and AS mapping rules have been updated, so the UE may update the mapping rule and transmit the uplink packet according thereto. For example, two-operation mapping may also be used for uplink. First, IP flows are mapped to QoS flows through NAS signaling, and QoS flows 2*d*-45, 2*d*-46, and 2*d*-47 are mapped to determined DRBs 2*d*-55, 2*d*-60, and 2*d*-65, respectively, in the AS. The UE may mark a QoS flow ID in the uplink packet, or may transmit the packet without marking the QoS flow ID. The function is performed by the SDAP of the UE. When the QoS flow ID is marked in the uplink packet, the NR gNB marks the QoS flow ID without the uplink traffic flow template (TFT) in the packet through which the information is transmitted to NG-U and transmits the packet.

Figure 2E:
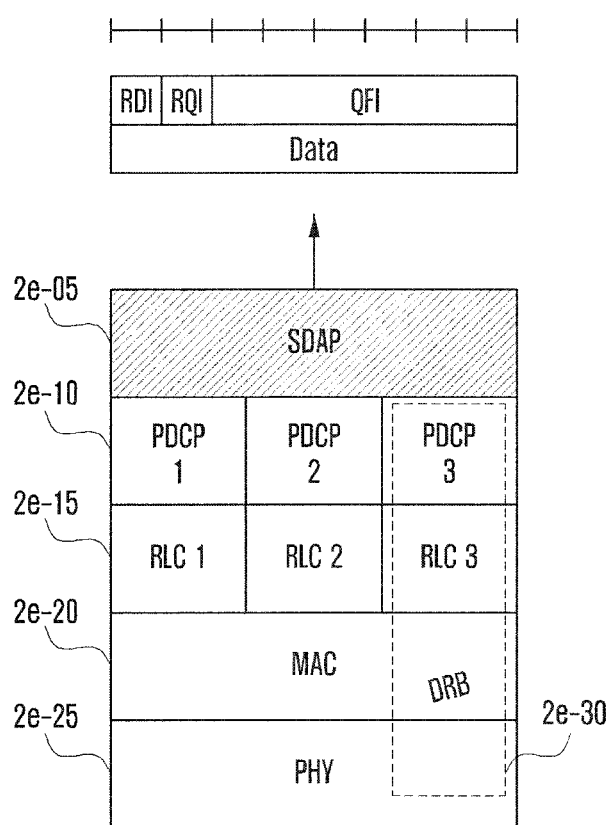
FIGS. 2EA and 2EB illustrate a protocol stack including a service data access protocol (SDAP) in NR according to an embodiment of the disclosure.
Figure 2E:
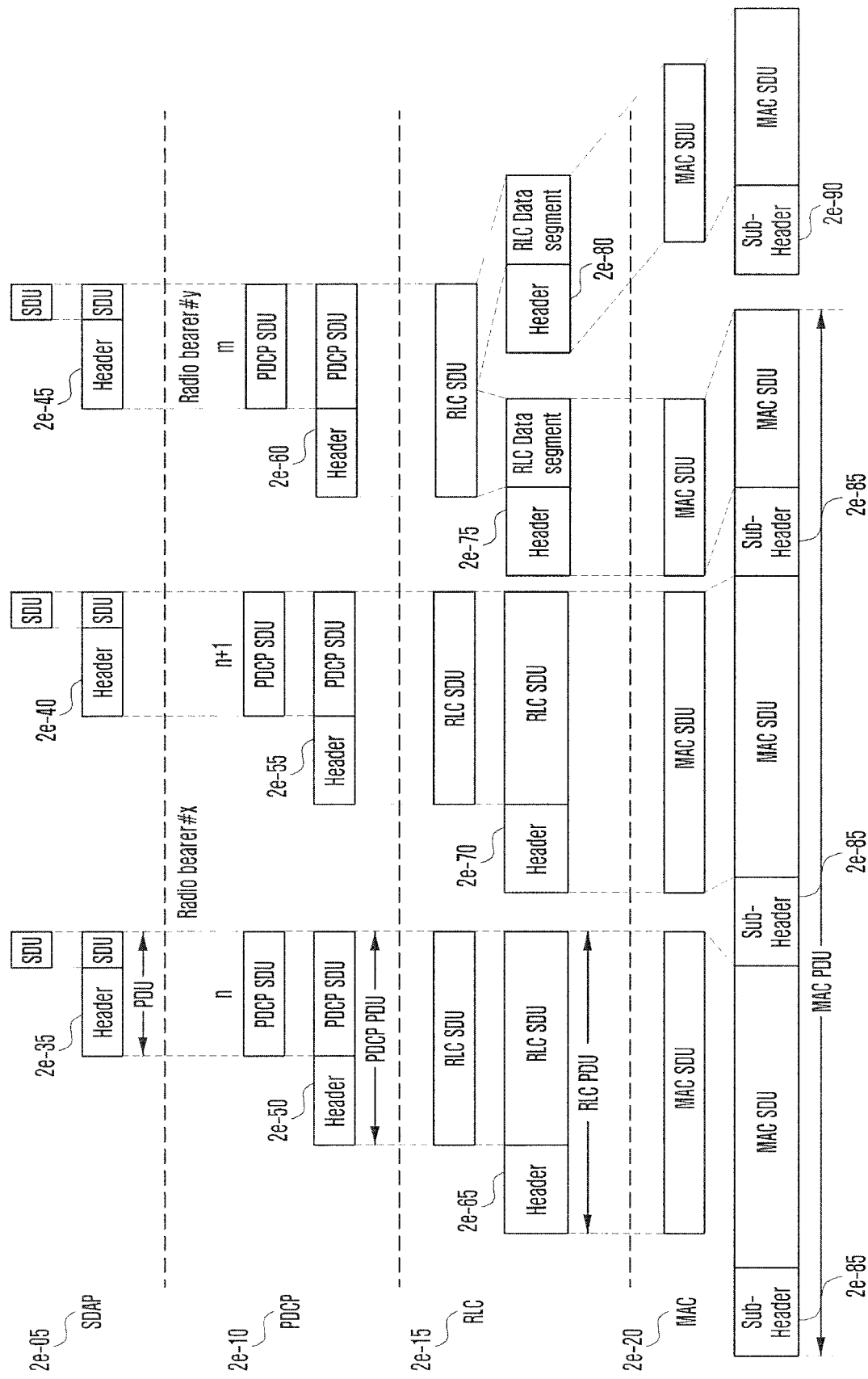

FIGS. 2EA and 2EB illustrate a protocol stack including an SDAP in NR according to an embodiment of the disclosure.

Referring to FIGS. 2EA and 2EB, in order to handle a new QoS function of the NR system, the following information should be transmitted through a radio interface.

Downlink: QoS flow ID+RQI+RDI
Uplink: QoS flow ID

In NR, an interface for transmitting the new information to a Uu is needed, and a new protocol for performing the function is defined on the PDCP 2*e*-10 layer. The SDAP 2*e*-05 is not a DRB-based protocol, and packets are transmitted according to the configured DRB 2*e*-30 mapping rule. For example, IP traffic is generated, and the SDAP 2*e*-05 maps the IP flow to the QoS flow ID and then maps the QoS flow ID to the DRB. The IP traffic includes an IP header and a payload, and the SDAP headers 2*e*-35, 2*e*-40, and 2*e*-45 may be located before the IP packet. The PDCP 2*e*-10 compresses the IP header and adds PDCP headers 2*e*-50, 2*e*-55, and 2*e*-60. The RLC 2*e*-15 and the MAC 2*e*-20 also sequentially add RLC headers 2*e*-65, 2*e*-70, and 2*e*-75, 2*e*-80 and MAC sub-headers 2*e*-85 and then a MAC header 2*e*-90, and then transmit a MAC PDU to the PHY 2*e*-25.

When the gNB determines to apply a reflective mechanism to the UE (instructs the UE to transmit an uplink packet through a DRB, which is the same as the DRB through which a QoS flow ID included in a downlink packet is transmitted), the gNB inserts the QoS flow ID and a reflective QoS indicator (RDI+RQI) into the ADAP 2*e*-05 layer of the downlink packet and transmits the downlink packet. The SDAP header has a length of 1 byte and may include the QoS flow ID (6 bits) and RQI (1 bit)+RDI (1 bit). For example, 64 QoS flows may be transmitted to the SDAP header, and it is not possible to specify more QoS flows. The disclosure encompasses the hypothetical case of QoS flows larger than 64 QoS flows in the future, which may be an example of a need of a large number of transmission control protocol (TCP) connections and connection configuration of user data protocol (UDP) sessions.

During the process, if the gNB transmits all data packets including the QoS flow ID, the operation of updating the mapping rule through the QoS flow ID received by the UE is continuously performed. For example, if the RQI bit and the RDI bit of 1 bit are set to "1", the UE updates the NAS mapping rule and the AS mapping rule under the assumption that each of the mapping rules of the NAS and the AS is updated, and transmits the uplink data packet according to the corresponding rule. Basically, the NAS reflective QoS is triggered when a mapping rule between the IP flow and the QoS flow is updated in the NR CN, and the AS reflective QoS is triggered when a mapping rule between the QoS flow and the DRB is updated in the wireless NB.

However, based on signaling between the NR NB and the CN, if the NAS mapping rule is updated, the CN configures an RQI bit indicating the update in an N3 header of the data packet transmitted to the NR NB and transmits the data packet. The N3 header is an interface between the CN and the NR NB. If the RQI bit of the N3 header received from the CN is set to "1", the NR NB sets the RQI bit of the SDAP header to "1" and transmits the RQI bit to the UE. Alternatively, if the AS mapping rule is changed even though the RQI bit of the N3 header is set to "0", the RDI bit of the SDAP header is set to "1" and transmitted to the UE. However, when the operation is performed, the UE should continuously store a mapping information table for NAS mapping and AS mapping, and thus the amount of information that the UE is required to store may increase, and if the information is not properly managed, confusion due to overlapping mapping may occur. In order to solve the problem, the UE and the NR CN operate a timer immediately when the NAS reflective QoS rule is applied, and if the data packet to which the corresponding rule is applied is not received for a preset time, removes configured NAS reflective QoS mapping information. For reference, if the data packet to which the QoS mapping rule is applied is transmitted and received while the timer operates, the timer is restarted.

Figure 2F:
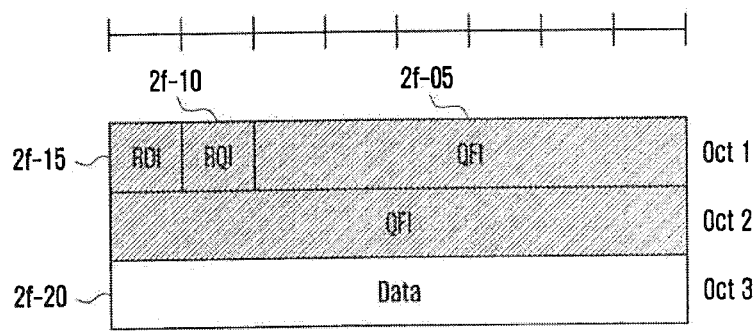
FIG. 2F illustrates a method of fixedly configuring a QoS flow identification (ID) having an extended length according to an embodiment of the disclosure.

FIG. 2F illustrates a method of fixedly configuring a QoS flow ID having an extended length according to an embodiment of the disclosure.

Referring to FIG. 2F, 64 QoS flows can be identified through the 6-bit QoS flow IDs of the related art, but there may be a need to indicate a number of QoS flows larger than 64 QoS flows, which may be an example of the need of many TCP connections and connection configuration of UDP sessions. In the method regarding FIG. 2F, the NR NB may fixedly configure and use mapping between the corresponding DRB and the extended QoS flow ID through RRC configuration. The N3 header, which is the interface between NR NBs, may support 2-byte QoS flow IDs, and thus, if the CN supports the extended QoS flow IDs, a wireless end may additionally support 1-byte information of the QoS flow IDs.

A QFI field 2*f*-05 may be expressed by 14 bits, generated by adding 8 bits to 6 bits, and 2^14 QoS flows may be identified. The extended 14-bit QFI may always be present once it is configured for a particular DRB. This is identical to the solution with 6 bit QFI. Alternatively, the QFI may be expressed in a smaller number of bits than 14 bits, and some of the second octet of the SDAP header may be expressed by reserved bits. Like the SDAP header of the related art, the RAI bit and the RDI bit of 2*f*-10 and 2*f*-15 are included, and the data packet of 2*f*-20 is located after the SDAP header. As described above, by configuring the use of the extended QoS flow IDs to the configured DRBs, the corresponding mapping rule is fixedly applied to the corresponding DRBs.

Figure 2G:
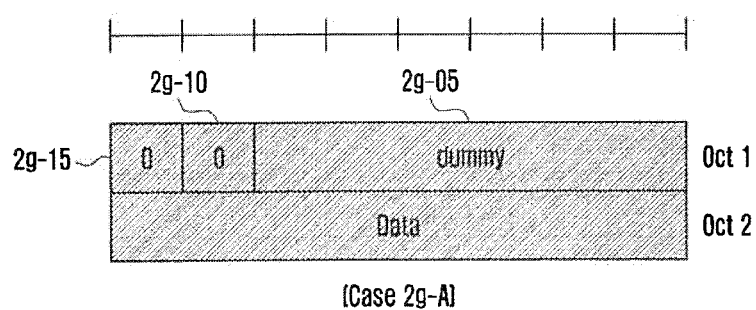
FIG. 2G illustrates method 1 of dynamically configuring a QoS flow ID having an extended length according to an embodiment of the disclosure.
Figure 2G:
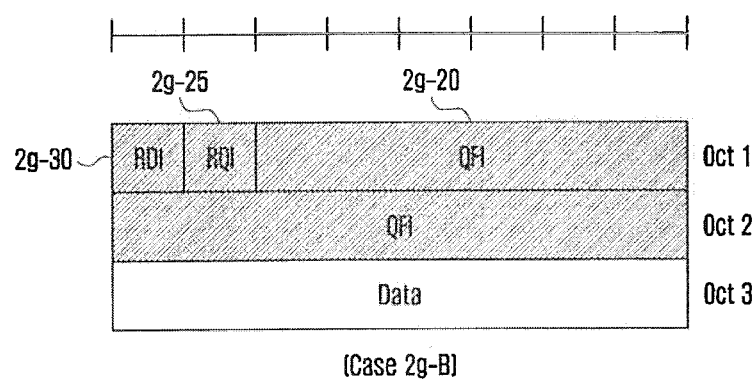

FIG. 2G illustrates method 1 of dynamically configuring a QoS flow ID having an extended length according to an embodiment of the disclosure.

Referring to FIG. 2G, 64 QoS flows can be identified through the 6-bit QoS flow IDs of the related art, but there may be a need to indicate a number of QoS flows larger than 64 QoS flows, which may be an example of the need for many TCP connections and connection configuration of UDP sessions. The N3 header, which is the interface between NR NBs, may support 2-byte QoS flow IDs, and thus if the CN supports the extended QoS flow IDs, a wireless end may additionally support 1-byte information of the QoS flow IDs. Embodiment 2-2 of the disclosure describes a method of using the SDAP header including the dynamically extended QoS flow IDs.

A QFI field 2*g*-05 may be expressed by 14 bits, generated by adding 8 bits to 6 bits, and 2^14 QoS flows may be identified. The extended 14-bit QFI may be present only when at least one of the reflective QoS bits are set (case 2*g*-B). Otherwise, if both reflective QoS bits are set to "0", then there is only one octet header with 6-bits set to a dummy value (or all zeroes) (case 2*g*-A). Alternatively, the QFI may be expressed using a smaller number of bits than 14 bits, and some of the second octet of the SDAP header may be expressed using reserved bits. Like the SDAP header of the related art, the RQI bit and the RDI bit of 2*g*-10 and 2*g*-15 are included, and the data packet is located after the SDAP header. The extended QFI field 2*g*-20 may be applied to the case in which one of the RQI bit 2*g*-25 and the RDI bit 2*g*-30 is set to "1" (case 2*g*-B), and the 6-bit QFI is applied to the case in which both the RQI bit and the RDI bit are set to "0" (case 2*g*-A). If the QFI field value is the same as the previously applied QFI field value, the UE already has the corresponding mapping rule, and thus the UE does not need the QFI information if the mapping rule is not updated (the case in which both the RQI bit and the RDI bit are set to "0"). Therefore, in this case, in order to reduce the overhead of the SDAP header, the 6-bit QFI of the related art is used without the use of the extended 14-bit QFI. Further, in this case, a dummy value (or all zeroes) may be included in the 6-bit QFI field value. This is because the UE does not analyze the QFI value in the case in which both the RQI bit and the RDI bit are set to "0".

Figure 2H:
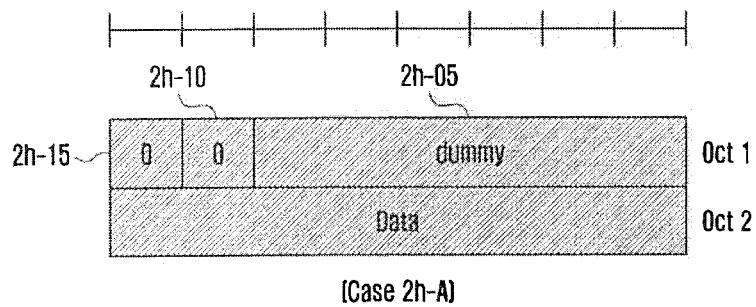
FIG. 2H illustrates method 2 of dynamically configuring a QoS flow ID having an extended length according to an embodiment of the disclosure.
Figure 2H:
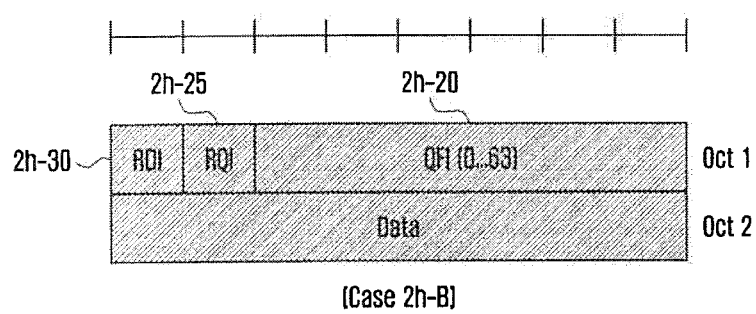
Figure 2H:
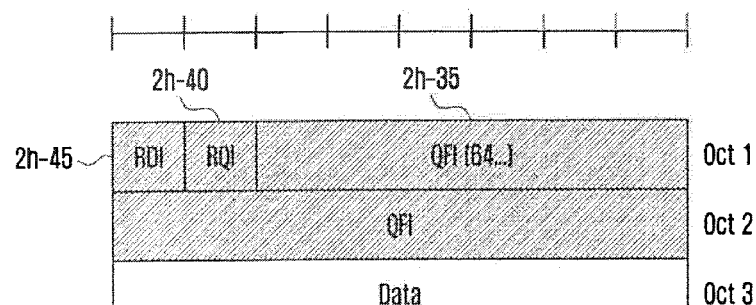

FIG. 2H illustrates method 2 of dynamically configuring a QoS flow ID having an extended length according to an embodiment of the disclosure.

Referring to FIG. 2H, 64 QoS flows can be identified through the 6-bit QoS flow IDs of the related art, but there may be a need to indicate a number of QoS flows larger than 64 QoS flows, which may be an example of the need of many TCP connections and connection configuration of UDP sessions. The N3 header, which is the interface between NR NBs, may support 2-byte QoS flow IDs, and thus, if the CN supports the extended QoS flow IDs, a wireless end may additionally support 1-byte information of the QoS flow IDs. Embodiment 2-3 of the disclosure describes a method of using the SDAP header including the dynamically extended QoS flow IDs.

A QFI field 2*h*-05 may be expressed by 14 bits, generated by adding 8 bits to 6 bits, and 2^14 QoS flows may be identified. The dummy values (or all zeroes) are used when none of the reflective QoS bits are set (case 2*h*-A). Moreover, the 6-bits QFI is used when the QoS flow ID value is for range of 0-63 (case 2*h*-B), and the 14-bits QFI is used when the QoS flow ID value is more than 64 (case 2*h*-C). Alternatively, the QFI may be expressed using a smaller number of bits than 14 bits, and some of the second octet of the SDAP header may be expressed using reserved bits. Like the SDAP header of the related art, the RQI bit and the RDI bit of 2*g*-10 and 2*g*-15 are included, and the data packet is located after the SDAP header. The extended QFI field 2*h*-35 may be applied to the case in which the QoS flow IDs (i.e., RQI bit 2*h*-40 and the RDI bit 2*h*-45) that the NR NB applies are larger than 64 (case 2*h*-C) and the 6-bit QFI 2*h*-20 is applied to the case in which the number of QoS flow IDs (i.e., RQI bit 2*h*-25 and the RDI bit 2*h*-30) that the NR NB allocates is smaller than 63 (case 2*h*-B). Further, when both the RQI bit 2*h*-10 and the RDI bit 2*h*-15 are set to "0" (case 2*h*-A), the 6-bit QFI is applied. If the QFI field value is the same as the previously applied QFI field value, the UE already has the corresponding mapping rule, and thus the UE does not need the QFI information if the mapping rule is not updated (the case in which both the RQI bit and the RDI bit are set to "0"). Therefore, in this case, in order to reduce the overhead of the SDAP header, the 6-bit QFI of the related art is used, rather than using the extended 14-bit QFI. Further, in this case, a dummy value (or all zeroes) may be included in the 6-bit QFI field value. This is because the UE does not analyze the QFI value in the case in which both the RQI bit and the RDI bit are set to "0".

FIG. 2I illustrates an overall QoS processing operation to which a QoS mapping rule between a CN and the UE is applied.

Referring to FIG. 2I, the UE camps on a serving cell at operation 2*i*-05, configures the RRC connection to the corresponding cell, and transitions to the connected mode at operation 2*i*-10. At operation 2*i*-15, the UE receives information on whether the CN supports the NAS reflective QoS operation and NAS mapping timer information from the NR CN and receives information on whether the SDAP header (RQI, RDI, and QoS flow ID) is used from the RRC message of the gNB through SDAP configuration. The message may be simultaneously given through RRC, or may be received through an RRC message separately from the NAS. The NAS mapping timer may be a timer indicating how long the CN and the UE can store the QoS mapping rule for a particular NAS IP packet, and if the timer expires, the corresponding mapping information is deleted. At operation 2*i*-20, the CN indicates whether to use the extended 14-bit QFI to the gNB. The information may be transmitted along with the SDAP configuration information at operation 2*i*-15. Further, the information may be indicated for each PDN session. Thereafter, the gNB may know that the NR CN uses the extended QFI and may then indicate the extended QFI to the UE through the methods with respect to FIGS. 2F, 2G, and 2H of the disclosure.

At operation 2*i*-25, the CN supporting the NAS reflective QoS operation identifies whether NAS reflective QoS mapping (mapping between the IP flow and the QoS flow) is updated for the IP packet to be transmitted to the UE, and if an update is needed, set the RQI of the N3 header of the IP packet to "1" and transmit the IP packet to the gNB. Simultaneously with the operation, the CN executes a NAS mapping timer at operation 2*i*-30. The gNB checks the RQI bit of the N3 header of the received packet, and if the RQI bit is set to "1", identifies whether the AP mapping rule is updated at operation 2*i*-35. If needed, the gNB sets the RQI bit and the RDI bit of the SDAP header to "1" at operation 2*i*-40 and transmits the data packet to the UE at operation 2*i*-45. In the above operation, the RQI bit and the RDI bit are set through independent procedures, and the case in which both the RQI bit and the RDI bit are set to "1" is illustrated in the drawing merely to show an example. At this time, the UE executes the NAS mapping timer. The condition under which the RQI bit of the SDAP header is set to "1" corresponds to the case in which the RQI bit of the N3 header is set, and the RDI bit is set by determination by the gNB when mapping information between the QoS flow and the RB is updated. The UE receives the data packet from the gNB, and if the RQI of the SDAP header is set to "1", executes the NAS mapping timer at operation 2*i*-50. At operation 2*i*-55, the UE performs the reflective QoS operation (AS/NAS mapping rule update) and transmits an uplink data packet according to the updated information at operation 2*i*-60. At operation 2*i*-65, the gNB transmits the data packet received from the UE to the CN. If the configured timer expires in the UE and the CN at operation 2*i*-70 and operation 2*i*-80, the UE and the CN delete the NAS QoS mapping rule for the corresponding IP packet at operation 2*i*-75 and operation 2*i*-85.

Figure 2J:
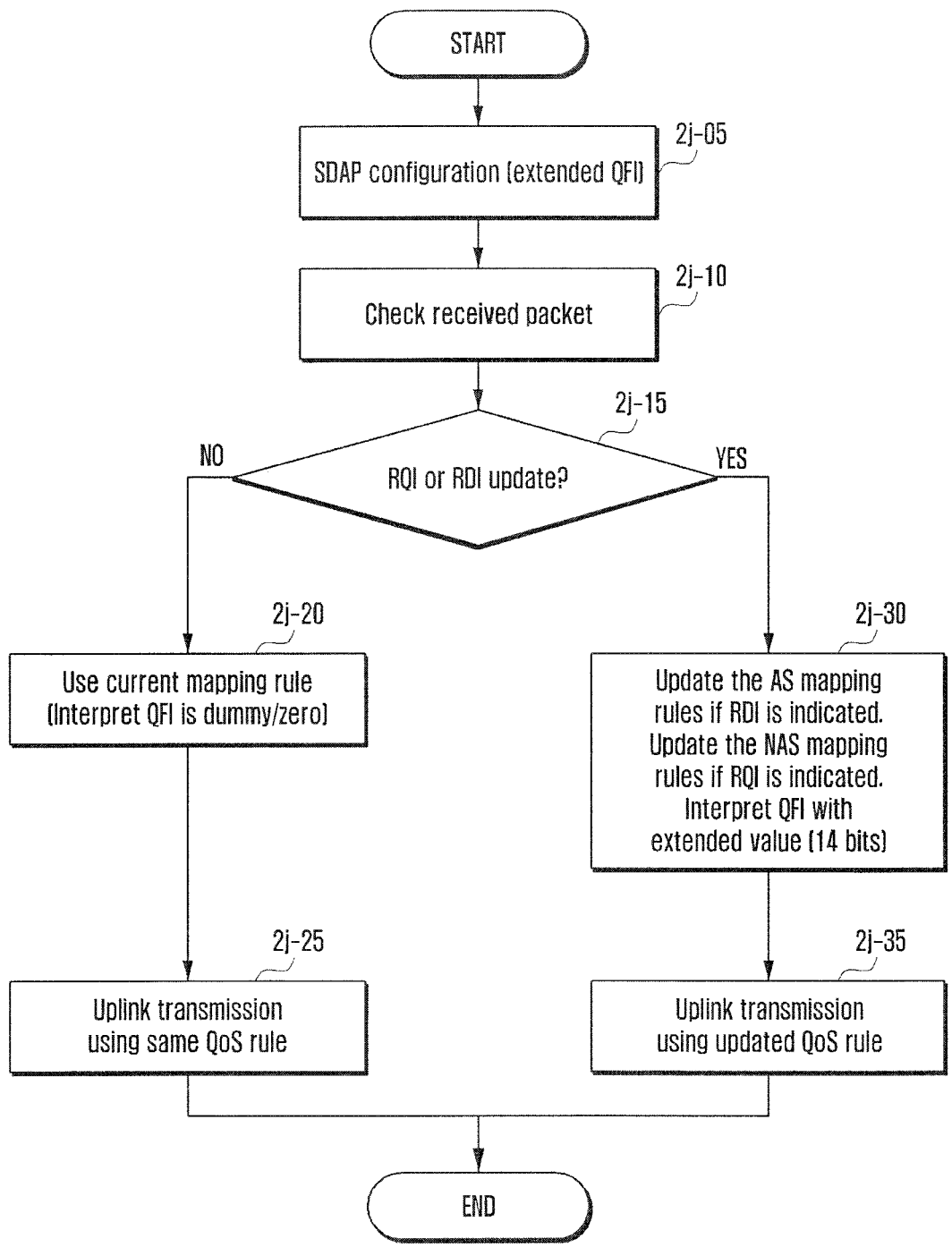
FIG. 2JA illustrates a QoS-related operation, particularly, a method of configuring and using a QFI of an SDAP header by a UE in a next-generation mobile communication system according to an embodiment of the disclosure, FIG. 2JB illustrates a QoS-related operation, particularly, a method of configuring and using a QFI of an SDAP header by a UE in a next-generation mobile communication system according to an embodiment of the disclosure.
Figure 2J:
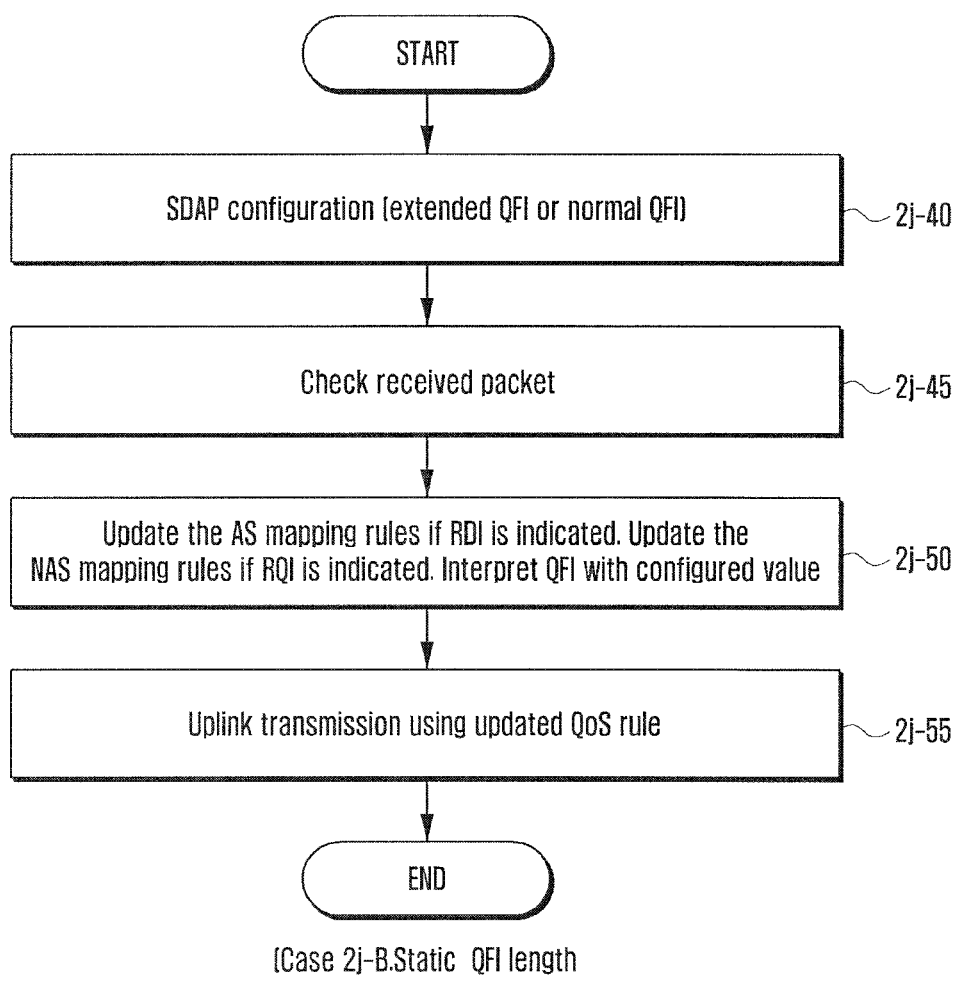

FIG. 2JA illustrates a QoS-related operation, particularly a method of configuring and using a QFI of an SDAP header by a UE in a next-generation mobile communication system according to an embodiment of the disclosure, and FIG. 2JB illustrates a QoS-related operation, particularly a method of configuring and using a QFI of an SDAP header by a UE in a next-generation mobile communication system according to an embodiment of the disclosure.

The methods with respect to FIGS. 2F, 2G, and 2H of the disclosure may be largely divided into two scenarios according to methods of using static/dynamic QFI length.

Referring to FIGS. 2JA and 2JB, case 2*j*-A corresponds to a UE operation for the method of dynamically using the QFI length (b bits or 14 bits) and case 2*j*-B corresponds to a UE operation for the method of statistically using the QFI length (6 bits or 14 bits).

First, in case 2*j*-A, the terminal receives SDAP-related configuration information from the gNB through an RRC message at operation 2*j*-05. The message may indicate whether the corresponding DRB uses an SDAP header (RQI, RDI, or QoS flow ID) or may contain an indicator for indicating whether an extended QFI is used. The SDAP configuration may be signaled to be applied to each DRB or all DRBs, and an indicator for indicating whether the CN supports the extended QFI may be received through a NAS message along with information on whether the UE supports a NAS reflective QoS operation and NAS mapping timer information from the CN. Thereafter, when the UE identifies that the extended QoS flow ID is applied to the corresponding DRBs, the UE checks an SDAP header of a subsequently received data packet at operation 2*j*-10. When both the RQI bit and the RDI bit are set to "0" at operation 2*j*-15, the UE determines that the previously received QoS mapping rule is continuously used, and analyzes the QFI of the received SDAP as a dummy/zero bit of 6 bits at operation 2*j*-20. For example, it is not required to analyze the corresponding QFI. Thereafter, when uplink transmission for the corresponding QoS flow is generated, the UE makes the SDAP header according to the stored QoS mapping rule and transmits the uplink packet at operation 2*j*-25. If at least one of the RQI bit or the RDI bit is set to "1" at operation 2*j*-15, the UE updates the AS/NAS reflective QoS mapping rule according to the indication of the corresponding RQI and RDI at operation 2*j*-30. For example, when the RQI is set to "1", the NAS mapping rule is updated. When the RDI is set to "1", the AS mapping rule is updated. Further, when it is configured to apply the extended QFI to the corresponding DRB at operation 2*j*-05, the UE analyzes the QFI field as extended 14 bits at operation 2*j*-30 (or QFI 6 bits may be applied and analyzed when the QFI is equal to or smaller than 63 and QFI 14 bits may be applied and analyzed when the QFI is larger than or equal to 64). Thereafter, when uplink transmission for the corresponding QoS flow is generated, the UE makes the SDAP header according to the updated QoS mapping rule and transmits the uplink packet at operation 2*j*-35.

In case 2*j*-B, the UE receives SDAP-related configuration information from the gNB through an RRC message at operation 2*j*-40. The message may indicate whether the corresponding DRB uses an SDAP header (RQI, RDI, or QoS flow ID), or may contain an indicator for indicating whether an extended QFI having a fixed value is used. The SDAP configuration may be signaled to be applied to each DRB or all DRBs, and an indicator for indicating whether the CN supports the extended QFI may be received through a NAS message along with information on whether the UE supports a NAS reflective QoS operation and NAS mapping timer information from the CN. Thereafter, when the UE identifies that the extended QoS flow ID having the fixed value is applied to the corresponding DRBs, the UE analyzes the SDAP for a data packet received later at operation 2*j*-45. At operation 2*j*-50, the UE updates an AS/NAS reflective QoS mapping rule according to the indication of the corresponding RQI and RDI. For example, when the RQI is set to "1", the NAS mapping rule is updated. When the RDI is set to "1", the AS mapping rule is updated. Further, in the above operation, the UE analyzes the QFI of fixed 6 bits and performs the corresponding operation. Thereafter, when uplink transmission for the corresponding QoS flow is generated, the UE makes the SDAP header according to the updated/stored QoS mapping rule and transmits the uplink packet at operation 2*j*-55.

Figure 2K:
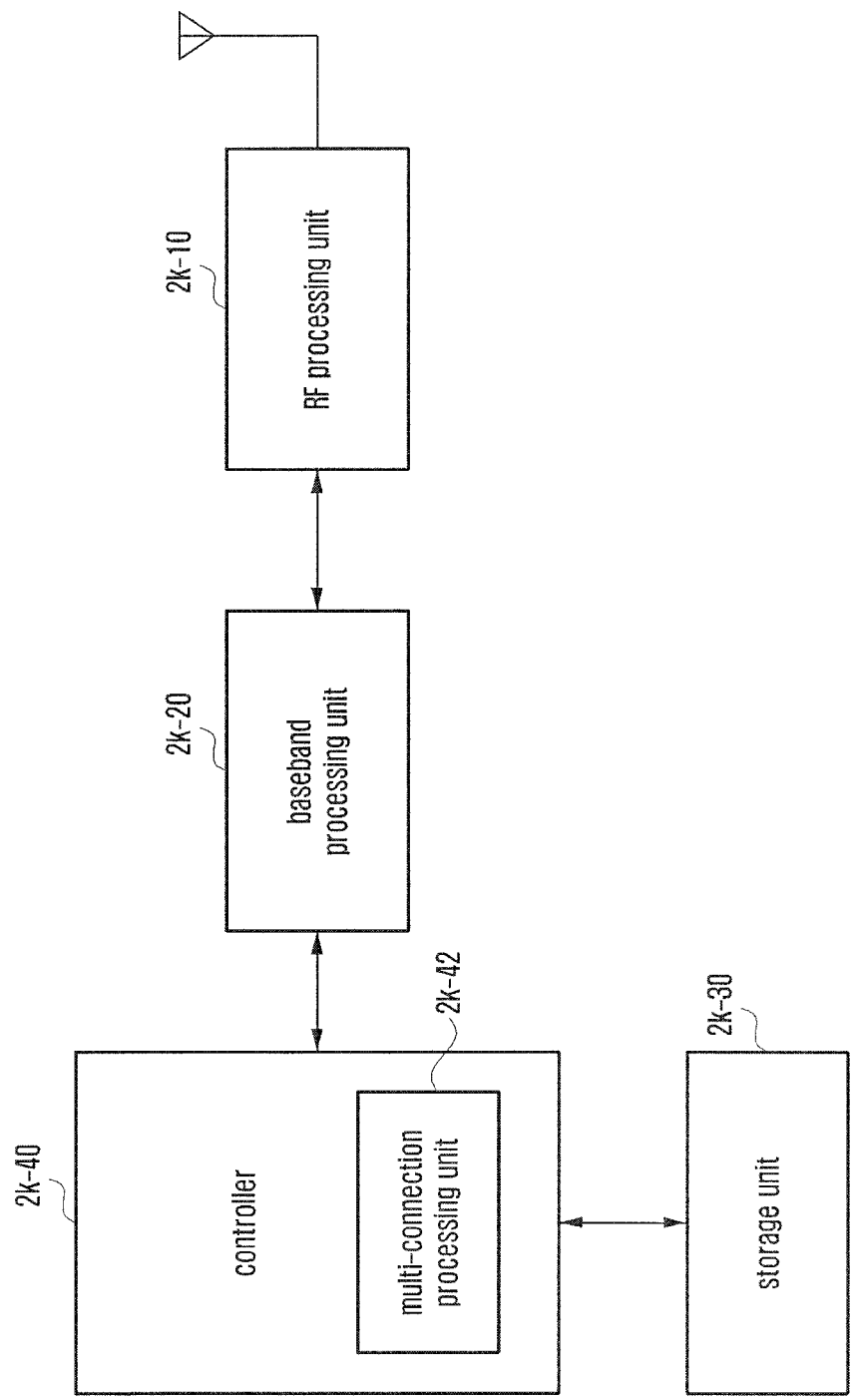
FIG. 2K is a block diagram illustrating an internal structure of a UE to according to an embodiment of the disclosure.

FIG. 2K is a block diagram illustrating an internal structure of a UE according to an embodiment of the disclosure.

Referring to FIG. 2K, the UE includes a RF processing unit 2*k*-10, a baseband processing unit 2*k*-20, a storage unit 2*k*-30, and a controller 2*k*-40.

The RF processing unit 2*k*-10 performs a function for transmitting and receiving a signal through a radio channel, such as band conversion and amplification of a signal. For example, the RF processing unit 2k-10 up-converts a baseband signal provided from the baseband processing unit 2k-20 into an RF band signal, transmits the RF band signal through an antenna, and then down-converts the RF band signal received through the antenna into a baseband signal. For example, the RF processing unit 2k-10 may include a transmission filter, a reception filter, an amplifier, a mixer, an oscillator, a DAC, an ADC, and the like. Although FIG. 2K illustrates only one antenna, the UE may include a plurality of antennas. Further, the RF processing unit 2k-10 may include a plurality of RF chains. Moreover, the RF processing unit 2k-10 may perform beamforming. For the beamforming, the RF processing unit 2k-10 may control a phase and a size of each signal transmitted/received through a plurality of antennas or antenna elements. The RF processing unit may perform MIMO and receive a plurality of layers when performing the MIMO operation.

The baseband processing unit 2k-20 performs a function for conversion between a baseband signal and a bitstream according to a physical-layer standard of the system. For example, when transmitting data, the baseband processing unit 2k-20 generates complex symbols by encoding and modulating a transmission bitstream. Further, when receiving data, the baseband processing unit 2k-20 reconstructs a reception bitstream by demodulating and decoding a baseband signal provided from the RF processing unit 2k-10. For example, in an OFDM scheme, when data is transmitted, the baseband processing unit 2k-20 generates complex symbols by encoding and modulating a transmission bitstream, maps the complex symbols to subcarriers, and then configures OFDM symbols through an IFFT operation and a CP insertion. Further, when receiving data, the baseband processing unit 2k-20 divides the baseband signal provided from the RF processing unit 2k-10 in units of OFDM symbols, reconstructs the signals mapped to the subcarriers through a FFT operation, and then reconstructs a reception bitstream through demodulation and decoding.

The baseband processing unit 2k-20 and the RF processing unit 2k-10 transmit and receive a signal as described above. Accordingly, the baseband processing unit 2k-20 and the RF processing unit 2k-10 may be embodied as a transmitter, a receiver, a transceiver, or a communication unit. Further, at least one of the baseband processing unit 2k-20 and the RF processing unit 2k-10 may include a plurality of communication modules for supporting a plurality of different radio access technologies. In addition, at least one of the baseband processing unit 2k-20 and the RF processing unit 2k-10 may include different communication modules for supporting signals in different frequency bands. For example, the different radio access technologies may include a wireless LAN (for example, IEEE 802.11) and a cellular network (for example, LTE). Further, the different frequency bands may include a SHF (for example, 2 NRHz, NRhz) band and a millimeter (mm) wave (for example, 60 GHz) band.

The storage unit 2k-30 stores data, such as a basic program, an application, and setting information for the operation of the UE. Particularly, the storage unit 2k-30 may store information related to a second access node for performing wireless communication through a second radio access technology. The storage unit 2k-30 provides stored data in response to a request from the controller 2k-40.

The controller 2k-40 controls the overall operation of the UE. For example, the controller 2k-40 transmits and receives a signal through the baseband processing unit 2k-20 and the RF processing unit 2k-10. Further, the controller 2k-40 records data in the storage unit 2k-30 and reads the data. To this end, the controller 2k-40 may include at least one processor. For example, the controller 2k-40 may include a CP that performs control for communication and an AP that controls a higher layer, such as an application layer. The controller 2k-40 may include a multi-connection processing unit 2k-42 for processing information which is a reference for determining whether or not to allow multiple connections to the UE.

Figure 2L:
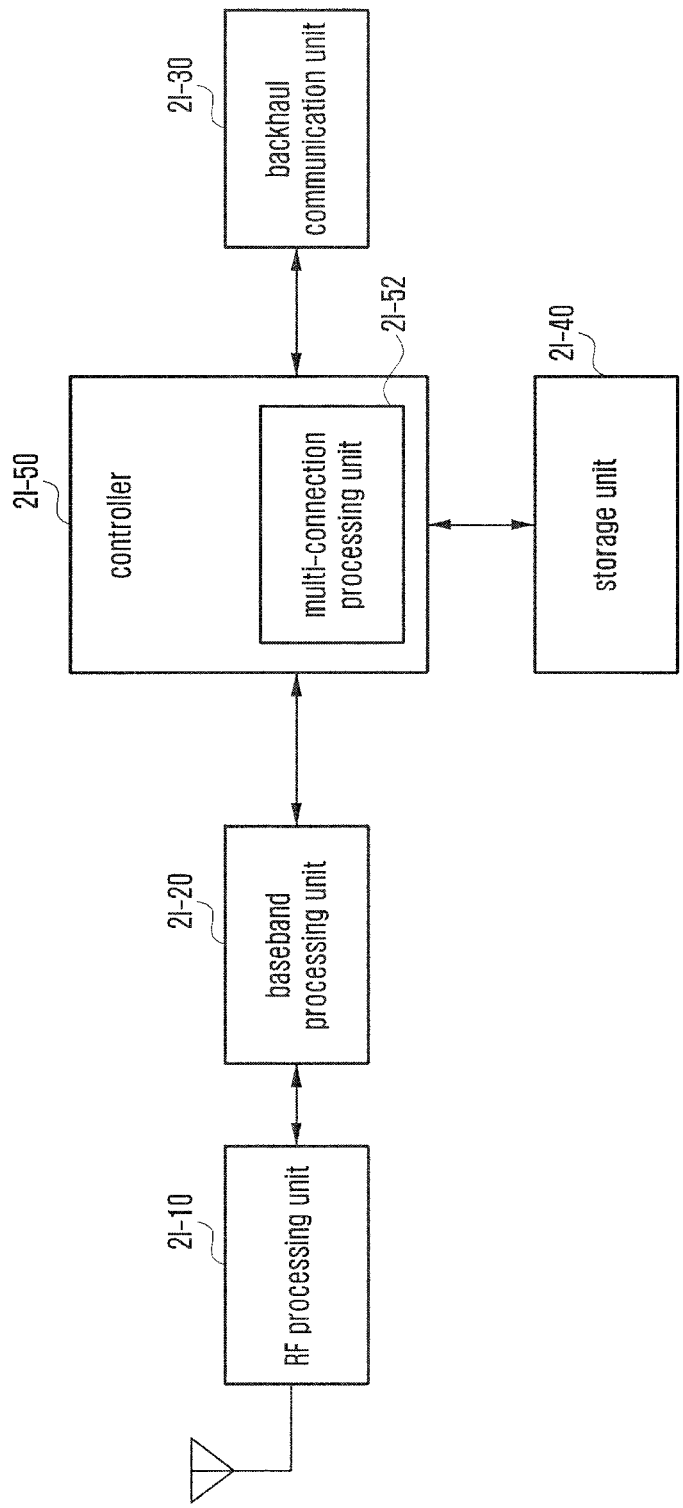
FIG. 2L is a block diagram illustrating a configuration of an NR NB according to an embodiment of the disclosure.

FIG. 2L is a block diagram illustrating a configuration of an NR NB according to an embodiment of the disclosure.

Referring to FIG. 2L, the NR NB includes an RF processing unit 2l-10, a baseband processing unit 2l-20, a backhaul communication unit 2l-30, a storage unit 2l-40, and a controller 2l-50.

The RF processing unit 2l-10 performs a function for transmitting and receiving a signal through a radio channel, such as band conversion and amplification of a signal. For example, the RF processing unit 2l-10 up-converts a baseband signal provided from the baseband processing unit 2l-20 into an RF band signal, transmits the RF band signal through an antenna, and then down-converts the RF band signal received through the antenna into a baseband signal. For example, the RF processing unit 2l-10 may include a transmission filter, a reception filter, an amplifier, a mixer, an oscillator, a DAC, and an ADC. Although FIG. 2L illustrates only one antenna, the first access node may include a plurality of antennas. In addition, the RF processing unit 2l-10 may include a plurality of RF chains. The RF processing unit 2l-10 may perform beamforming. For the beamforming, the RF processing unit 2l-10 may control the phase and size of each of the signals transmitted and received through a plurality of antennas or antenna elements. The RF processing unit may perform a downlink MIMO operation by transmitting one or more layers.

The baseband processing unit 2l-20 performs a function of performing conversion between a baseband signal and a bitstream according to a physical-layer standard of the first radio access technology. For example, when transmitting data, the baseband processing unit 2l-20 generates complex symbols by encoding and modulating a transmission bitstream. Further, when receiving data, the baseband processing unit 2l-20 reconstructs a reception bitstream by demodulating and decoding a baseband signal provided from the RF processing unit 2l-10. For example, in an OFDM scheme, when transmitting data, the baseband processing unit 2l-20 may generate complex symbols by encoding and modulating the transmission bitstream, map the complex symbols to subcarriers, and then configure OFDM symbols through an IFFT operation and CP insertion. In addition, when receiving data, the baseband processing unit 2l-20 divides a baseband signal provided from the RF processing unit 2l-10 in units of OFDM symbols, recovers signals mapped with subcarriers through an FFT operation, and then recovers a reception bit string through demodulation and decoding. The baseband processing unit 2l-20 and the RF processing unit 2l-10 transmit and receive a signal as described above. Accordingly, the baseband processing unit 2l-20 and the RF processing unit 2l-10 may be embodied as a transmitter, a receiver, a transceiver, a communication unit, or a wireless communication unit.

The backhaul communication unit 2l-30 provides an interface for communicating with other nodes within the network. For example, the backhaul communication unit 2l-30 converts a bitstream transmitted to another node, for example, the SeNB or a CN from the MeNB, into a physical signal and converts the physical signal received from the other node into the bitstream.

The storage unit 2*l*-40 stores data, such as a basic program, an application, and setting information for the operation of the MeNB. Particularly, the storage unit 2*l*-40 may store information on a bearer allocated to the accessed UE and a measurement result reported from the accessed UE. Further, the storage unit 2*l*-40 may store information which is a reference for determining whether or not to allow multiple connections to the UE. The storage unit 2*l*-40 provides stored data in response to a request from the controller 2*l*-50.

The controller 2*l*-50 controls the overall operation of the MeNB. For example, the controller 2*l*-50 transmits and receives a signal through the baseband processing unit 2*l*-20 and the RF processing unit 2*l*-10 or through the backhaul communication unit 2*l*-30. Further, the controller 2*l*-50 records data in the storage unit 2*l*-40 and reads the data. To this end, the controller 2*l*-50 may include at least one processor. The controller 2*l*-50 may include a multi-connection processing unit 2*l*-52 for processing information which is a reference for determining whether or not to allow multiple connections to the UE.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a terminal, the method comprising:
   receiving, from a base station, information for a sounding reference signal (SRS) configuration;
   receiving, from the base station, a medium access control (MAC) control element (CE) for activating a semi-persistent (SP) SRS; and
   transmitting, to the base station, an SRS on a first cell based on the information for the SRS configuration and the MAC CE for activating the SP SRS,
   wherein the MAC CE for activating the SP SRS includes an indicator for indicating whether serving cell information and bandwidth part (BWP) information for a reference signal associated with spatial relationship are present in the MAC CE, and
   wherein the BWP information indicates a BWP on which a resource used for spatial relationship derivation for an SRS resource of the SRS is located.

2. The method of claim 1,
   wherein the MAC CE for activating the SP SRS includes the serving cell information and the BWP information, in a case that the indicator is set to 1, and
   wherein the MAC CE for activating the SP SRS does not include the serving cell information and the BWP information, in a case that the indicator is set to 0.

3. The method of claim 1,
   wherein the serving cell information indicates an identity of a second cell on which the resource used for spatial relationship derivation for the SRS resource of the SRS is located.

4. The method of claim 1, wherein the MAC CE includes at least one of serving cell information for the SRS, BWP information for the SRS, or SRS resource information for an SRS resource of the SRS.

5. The method of claim 1,
   wherein the reference signal is one of a synchronization signal block (SSB), channel state information-reference signal (CSI-RS), or another SRS, and
   wherein the serving cell information and the BWP information are included in the MAC CE, in a case that a cell of the reference signal is different from the first cell on which the SRS is transmitted.

6. A terminal comprising:
   a transceiver; and
   a controller coupled with the transceiver and configured to:
   receive information for a sounding reference signal (SRS) configuration,
   receive a medium access control (MAC) control element (CE) for activating a semi-persistent (SP) SRS, and
   transmit an SRS on a first cell based on the information for the SRS configuration and the MAC CE for activating the SP SRS,
   wherein the MAC CE for activating the SP SRS includes an indicator for indicating whether serving cell information and bandwidth part (BWP) information for a reference signal associated with spatial relationship are present in the MAC CE, and
   wherein the BWP information indicates a BWP on which a resource used for spatial relationship derivation for an SRS resource of the SRS is located.

7. The terminal of claim 6,
   wherein the MAC CE for activating the SP SRS includes the serving cell information and the BWP information, in a case that the indicator is set to 1, and
   wherein the MAC CE for activating the SP SRS does not include the serving cell information and the BWP information, in a case that the indicator is set to 0.

8. The terminal of claim 6,
   wherein the serving cell information indicates an identity of a second cell on which the resource used for spatial relationship derivation for the SRS resource of the SRS is located.

9. The terminal of claim 6, wherein the MAC CE includes at least one of serving cell information for the SRS, BWP information for the SRS, or SRS resource information for an SRS resource of the SRS.

10. The terminal of claim 6,
    wherein the reference signal is one of a synchronization signal block (SSB), channel state information-reference signal (CSI-RS), or another SRS, and
    wherein the serving cell information and the BWP information are included in the MAC CE, in a case that a cell of the reference signal is different from the first cell on which the SRS is transmitted.

11. A method by a base station, the method comprising:
    transmitting, to a terminal, information for a sounding reference signal (SRS) configuration;
    transmitting, to the terminal, a medium access control (MAC) control element (CE) for activating a semi-persistent (SP) SRS; and
    receiving, from the terminal, an SRS on a first cell based on the information for the SRS configuration and the MAC CE for activating the SP SRS,
    wherein the MAC CE for activating the SP SRS includes an indicator for indicating whether serving cell information and bandwidth part (BWP) information for a reference signal associated with spatial relationship are present in the MAC CE, and wherein the BWP information indicates a BWP on which a resource used for spatial relationship derivation for an SRS resource of the SRS is located.

12. The method of claim 11, wherein the MAC CE for activating the SP SRS includes the serving cell information and the BWP information, in a case that the indicator is set to 1, and wherein the MAC CE for activating the SP SRS does not include the serving cell information and the BWP information, in a case that the indicator is set to 0.

13. The method of claim 11, wherein the serving cell information indicates an identity of a second cell on which the resource used for spatial relationship derivation for the SRS resource of the SRS is located.

14. The method of claim 11, wherein the MAC CE includes at least one of serving cell information for the SRS, BWP information for the SRS, or SRS resource information for an SRS resource of the SRS.

15. The method of claim 11, wherein the reference signal is one of a synchronization signal block (SSB), channel state information-reference signal (CSI-RS), or another SRS, and wherein the serving cell information and the BWP information are included in the MAC CE, in a case that a cell of the reference signal is different from the first cell on which the SRS is transmitted.

16. A base station comprising:

a transceiver; and a controller coupled with the transceiver and configured to:

transmit, to a terminal, information for a sounding reference signal (SRS) configuration, transmit, to the terminal, a medium access control (MAC) control element (CE) for activating a semi-persistent (SP) SRS, and receive, from the terminal, an SRS on a first cell based on the information for the SRS configuration and the MAC CE for activating the SP SRS, wherein the MAC CE for activating the SP SRS includes an indicator for indicating whether serving cell information and bandwidth part (BWP) information for a reference signal associated with spatial relationship are present in the MAC CE, and wherein the BWP information indicates a BWP on which a resource used for spatial relationship derivation for an SRS resource of the SRS is located.

17. The base station of claim 16, wherein the MAC CE for activating the SP SRS includes the serving cell information and the BWP information, in a case that the indicator is set to 1, and wherein the MAC CE for activating the SP SRS does not include the serving cell information and the BWP information, in a case that the indicator is set to 0.

18. The base station of claim 16, wherein the serving cell information indicates an identity of a second cell on which the resource used for spatial relationship derivation for the SRS resource of the SRS is located.

19. The base station of claim 16, wherein the MAC CE includes at least one of serving cell information for the SRS, BWP information for the SRS, or SRS resource information for an SRS resource of the SRS.

20. The base station of claim 16, wherein the reference signal is one of a synchronization signal block (SSB), channel state information-reference signal (CSI-RS), or another SRS, and wherein the serving cell information and the BWP information are included in the MAC CE, in a case that a cell of the reference signal is different from the first cell on which the SRS is transmitted.

* * * * *